US 7,660,866 B2
Feb. 9, 2010

(12) United States Patent
Chambliss et al.

(10) Patent No.: US 7,660,866 B2
(45) Date of Patent: *Feb. 9, 2010

(54) USE OF VIRTUAL TARGETS FOR PREPARING AND SERVICING REQUESTS FOR SERVER-FREE DATA TRANSFER OPERATIONS

(75) Inventors: David D. Chambliss, Morgan Hill, CA (US); Jeou-Rong Lay, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/182,173

(22) Filed: Jul. 30, 2008

(65) Prior Publication Data
US 2008/0288670 A1    Nov. 20, 2008

Related U.S. Application Data

(63) Continuation of application No. 10/383,951, filed on Mar. 7, 2003, now Pat. No. 7,461,131.

(51) Int. Cl.
*G06F 15/173* (2006.01)
(52) U.S. Cl. ..................................................... 709/213
(58) Field of Classification Search .................. 709/213; 710/22
See application file for complete search history.

(56) References Cited

U.S. PATENT DOCUMENTS

| 4,067,059 | A | 1/1978 | Derchak |
| 4,075,691 | A | 2/1978 | Davis et al. |
| 4,625,730 | A | 12/1986 | Fountain et al. |
| 5,426,639 | A | 6/1995 | Follett et al. |
| 5,546,385 | A | 8/1996 | Caspi et al. |
| 5,649,230 | A | 7/1997 | Lentz |
| 5,765,041 | A | 6/1998 | Cherichetti et al. |
| 5,897,658 | A | 4/1999 | Eskesen et al. |
| 6,021,408 | A | 2/2000 | Ledain et al. |
| 6,026,032 | A | 2/2000 | Nordman et al. |
| 6,047,339 | A | 4/2000 | Su et al. |

(Continued)

FOREIGN PATENT DOCUMENTS

JP    10-55298    2/1998

(Continued)

OTHER PUBLICATIONS

"IEEE P1394 Link Level Virtual First In/Outs For Command Block And Status Block Reception And Signalling," IBM Technical Disclosure Bulletin; vol. 38 No. Feb. 2, 1995, pp. 603-606.

*Primary Examiner*—David Y Eng
(74) *Attorney, Agent, or Firm*—Walter W. Duft

(57) ABSTRACT

A system, a storage manager server and a computer program product for utilizing virtual targets and abstract copy orders in preparing and servicing requests for server-free data transfer operations in a data storage network. The abstract copy orders represent data transfers between virtual targets and real devices. They allow source target copy orders to be prepared separately from destination target copy orders. The abstract copy orders may then be converted into concrete copy orders involving only real device targets for execution by a data mover that implements the server-free data transfer operations.

33 Claims, 21 Drawing Sheets

U.S. PATENT DOCUMENTS

| | | |
|---|---|---|
| 6,275,867 B1 | 8/2001 | Bendert et al. |
| 6,400,730 B1 | 6/2002 | Latif et al. |
| 6,857,059 B2 | 2/2005 | Karpoff et al. |
| 7,171,453 B2 | 1/2007 | Iwami |
| 7,194,550 B1 | 3/2007 | Chamdani et al. |
| 7,206,314 B2 | 4/2007 | Liao et al. |
| 7,236,496 B2 | 6/2007 | Chung et al. |
| 7,275,103 B1 | 9/2007 | Thrasher et al. |
| 2002/0004857 A1 | 1/2002 | Arakawa et al. |

FOREIGN PATENT DOCUMENTS

| | | |
|---|---|---|
| JP | 2002-222341 | 8/2000 |
| JP | 2002-24070 | 1/2002 |
| JP | 2002-366310 | 12/2002 |

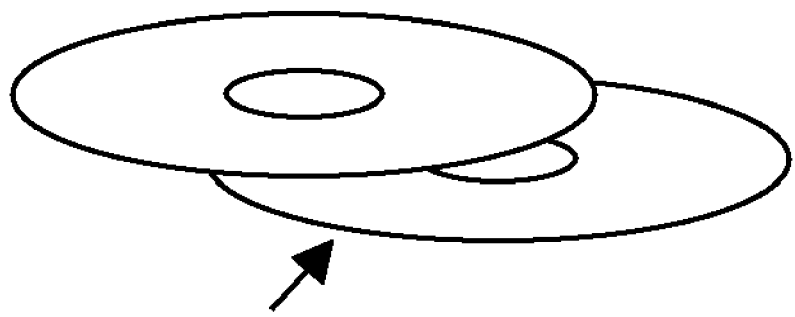
FIG. 21    200

USE OF VIRTUAL TARGETS FOR PREPARING AND SERVICING REQUESTS FOR SERVER-FREE DATA TRANSFER OPERATIONS

This application is a continuation under 35 U.S.C. 120 of application Ser. No. 10/383,951, filed Mar. 7, 2003, entitled "Use Of Virtual Targets For Preparing And Servicing Requests For Server-Free Data Transfer Operations."

BACKGROUND OF THE INVENTION

1. Field of the Invention

The present invention relates to data storage networks, and especially networks implementing SAN (Storage Area Network) functionality or the like. More particularly, the invention concerns server-free transfers of data between storage devices in a data storage network environment.

2. Description of the Prior Art

By way of background, data storage networks, such as SAN systems, provide an environment in which data storage peripherals are managed within a high speed network that is dedicated to data storage. Such networks often include a data storage manager server that handles data storage requests (e.g., copy, backup, etc.) from data client nodes (data clients) that are connected to the storage manager server via a conventional LAN (Local Area Network) or WAN (Wide Area Network). Within the data storage network, the storage manager server generally has access to all devices within the pool of peripheral storage, which may include any number of interconnected magnetic disk drive arrays, optical disk drive arrays, magnetic tape libraries, etc. In all but the smallest data storage networks, the required inter-connectivity is provided by way of arbitrated loop arrangements or switching fabrics, with the latter being more common.

There are facilities within the data storage network environment that a storage manager server conventionally uses to delegate the work of moving data between storage devices. For example, the SCSI-3 (small computer storage interface) extended copy command provides a means to copy data from one set of logical storage units in the data storage network to another set of logical storage units under the control of the storage manager server, but with the actual data transfer operations being performed by a "data mover" entity within the data storage network. This "server-free" data movement is performed by the data mover at the request of the storage manager server. All that is required of the storage manager server is to prepare the data source and destination devices and then prepare and issue the extended copy command to the data mover. Because it is not performing the actual data transfer operations, the storage manager server is free to handle more concurrent client connections and server operations.

The SCSI-3 extended copy command is conventionally composed of many "copy orders" that specify the source and destination storage devices (targets), and the data blocks to be transferred from each source target to each destination target. A problem that arises in this environment is that the entity which knows the source targets may not be the same entity that knows the destination targets. A third entity may be responsible for data manipulations such as compression, encryption and check data generation. These entities could be different pieces of a program or could be located on different computer systems. One party may not know what the other party knows, and the parties may not necessarily trust each other. This makes it difficult to create a copy order which has to have both the source target and the destination target specified for each data block to be transferred. Another problem is that it is difficult to provide the aforementioned data manipulations. With present capabilities, such transformations would have to be separately specified for each data source and destination target.

It is to solving the foregoing problems that the present invention is directed. In particular, what is required is an alternative system and method for handling server-free data transfers in which data copy commands may be formulated by entities that do not necessarily have complete knowledge of both the source and destination targets. An additional goal is to provide a system and method wherein data transformations such as compression, encryption and check data generation may be provided without knowledge of the characteristics of both targets involved in the data transfer.

SUMMARY OF THE INVENTION

The foregoing problems are solved and an advance in the art is obtained by a system that utilizes virtual targets and abstract copy orders in preparing and servicing requests for server-free data transfer operations in a data storage network. The abstract copy orders represent data transfers between virtual targets and real devices. They allow source target copy orders to be prepared separately from destination target copy orders. The abstract copy orders may then be converted into concrete copy orders involving only real device targets for execution by a data mover that implements the server-free data transfer operations.

In exemplary implementations of the invention, the virtual targets are virtual FIFOs and the concrete copy orders are, by way of example only, SCSI-3 extended copy command segment descriptors. The abstract copy orders can be converted into concrete copy orders by merging pairs of abstract copy orders that reference a common virtual target along with respective source and destination targets so that, for each abstract copy order pair, the source target is combined with the destination target to form a concrete copy order. This process may include grouping abstract copy orders involving a common virtual target into supplier and consumer lists, and merging pairs of abstract copy orders at the head of each list so that a source target associated with one abstract copy order of a pair is linked to a destination target associated with another abstract copy order of the pair. It may also be desirable to generate inter-virtual target abstract copy orders involving data transfers between virtual source and destination targets. Such inter-virtual target abstract copy orders can be used to accommodate data reordering or inline data insertion when implementing server-free data transfers. Each inter-virtual target abstract copy order can be collapsed into an abstract copy order supplying data from a real source target to the source virtual target and an abstract copy order providing data from the destination virtual target to a real destination target. It may also be desirable to divide abstract copy orders into separate abstract copy orders involving data transfers of smaller size in order to accommodate data deadlock conditions. Lastly, it may be desirable to generate data buffer commands for the data mover to buffer data until a data transfer to a real destination target can be performed that will allow an abstract copy order specifying the real destination target to be eliminated.

The invention further contemplates a storage manager server for a data storage network and a computer program product that allows the above-described server-free data transfer functionality to execute on a data storage network device.

BRIEF DESCRIPTION OF THE DRAWINGS

The foregoing and other features and advantages of the invention will be apparent from the following more particular description of preferred embodiments of the invention, as illustrated in the accompanying Drawings, in which:

FIG. 21 is a diagrammatic illustration of a computer program product medium storing computer program information that facilitates server-free data transfer in accordance with the invention.

DETAILED DESCRIPTION OF PREFERRED EMBODIMENTS

Figure 1:
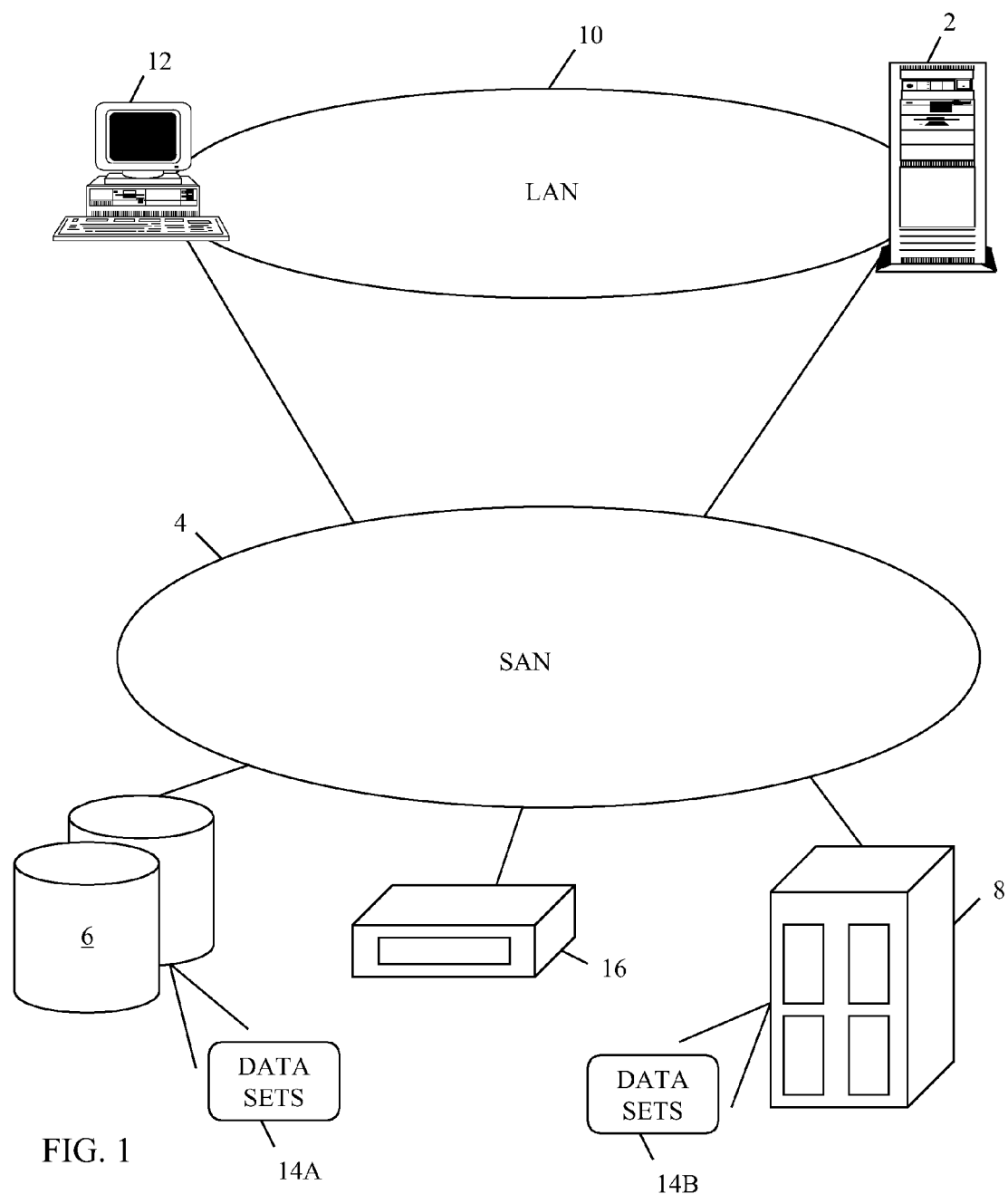
FIG. 1 is a functional block diagram showing a data storage network in which the present invention can be implemented.

Turning now to the figures, wherein like reference numerals represent like elements in all of the several views, FIG. 1 illustrates a storage manager server 2 that is adapted to perform server-free data transfer operations in accordance with the invention. The storage manager server 2 communicates with a storage area network (SAN) 4 that interconnects plural data storage devices by way of a suitable network connectivity scheme, such as an arbitrated loop arrangement, a switching fabric, or otherwise. The storage devices may include, by way of example only, a disk storage system 6 and a tape library storage system 8. The storage manager server 2 also communicates with a local area network (LAN) 10 that comprises one or more data processing clients, such as the client system 12. Data sets associated with the client system 12 will be assumed to reside on storage resources within the SAN 4, such as the disk system 6 (storing data set 14A) and/or the tape library system 8 (storing data set 14B). The client system 12 may initially deposit these data sets into their respective storage resources by way of its own connection to the SAN 4, or via the storage manager server 2.

There are a variety of system components that can be used to implement the various elements that make up the SAN 4, depending on design preferences. Underlying the SAN design will be the selection of a suitable communication and media technology, such as Fibre Channel, Ethernet or SCSI. Selection of one of these core technologies will dictate the choice of devices that will be used to implement the SAN switching elements as well as the network interfaces that reside in the devices that connect to the SAN.

The storage manager server 2 is assumed to be configured as a SAN application server offering a suitable access interface to the client system 12. It can be built from a conventional programmable computer platform that is configured with the hardware and software resources needed to implement the required data transfer functions. Exemplary computer platforms include mainframe computers such as an IBM® S/390® system running the IBM® OS/390® operating system, mid-range computers such as an IBM® AS/400® system running the IBM® OS/400® operating system, workstation computers such as an IBM RISC SYSTEM/6000 system running the IBM® Advanced Interactive Executive (AIX®) operating system, or any number of microprocessor-based personal computers running a WINDOWS® operating system, a UNIX® or Unix-like operating system or operating system kernel. An exemplary server application software environment that may be used to implement the storage manager server 2 is the IBM® TIVOLI® Storage Manager product.

The storage manager server 2 further includes an appropriate network interface, such as a Fibre Channel Host Bus Adapter (HBA), which allows it to communicate over the SAN 4 (if the SAN 4 is a Fibre Channel network). An additional network interface, such as an Ethernet card will typically be present to facilitate data communication over the LAN 10 (if the LAN 10 is an Ethernet network).

Periodically, there may be a need to transfer the data sets of the client system 12 between storage devices in the SAN 4. For example, the client system 12 may want the data set 14A transferred from the disk system 6 to the tape library system 8. The client system 12 can initiate such transfers by issuing a data backup, archive or migration request to the storage manager server 2. Depending on implementation specifics, the transfer request could involve one or more files, volumes or other data sets located on one or more source storage device targets of the SAN 4 and may require transfer of such data to one or more destination storage device targets of the SAN.

To improve SAN efficiency, the storage manager sever 2 is adapted to handle data transfer requests of the foregoing type on a "server-free" basis. Without limiting the generality of the invention, it will be assumed for ease of discussion that the storage manager server 2 uses the SCSI-3 extended copy command to implement server free data transfers. As briefly described by way of background above, the SCSI-3 extended copy command enables the transfer of data sets from one set of storage device targets to another set of storage device targets with minimal involvement of the command initiator. The command initiator generates the extended copy command and then calls upon another entity, referred to as the "data mover," to handle the actual transfer of data between the source and destination targets. In the SAN 4, the storage manager server 2 is assumed to be programmed to act as a SCSI-3 extended copy command initiator. An exemplary data mover is shown by reference numeral 16. It can be implemented as a SCSI-3 SAN router/bridge or any other SCSI-3 device capable of executing SCSI-3 extended copy commands issued by the storage manager server 2. As is known, a data mover could also be implemented as an added component of the disk system 6, the tape library system 8, or otherwise.

Figure 2A:
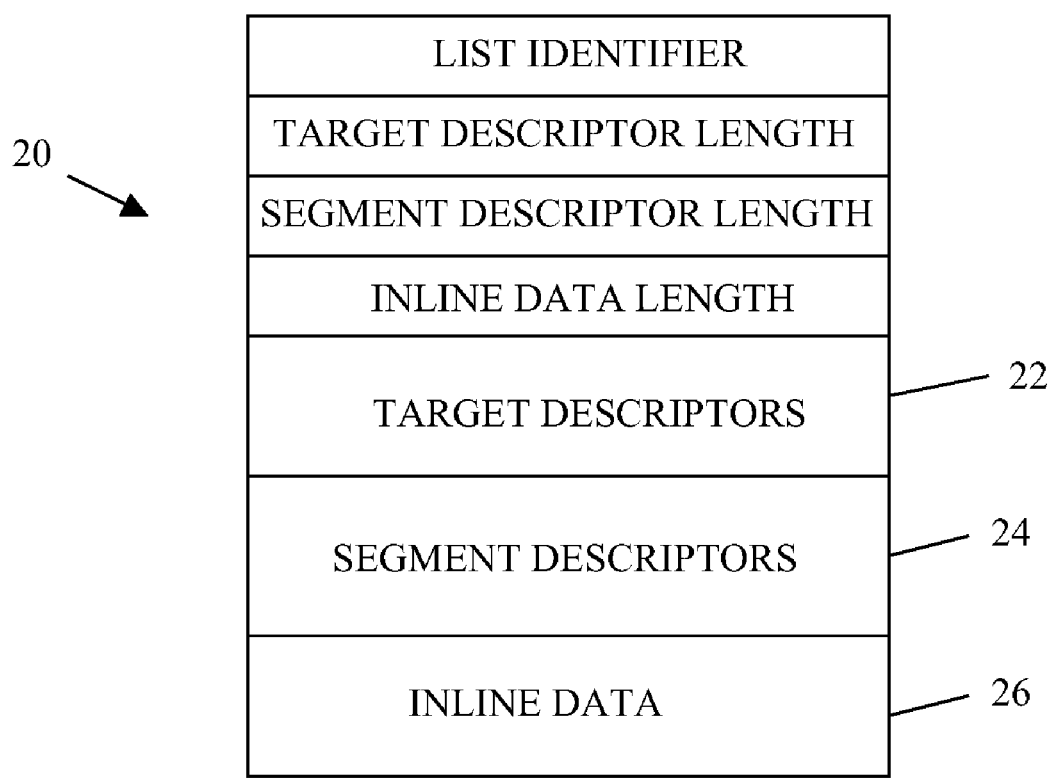
FIG. 2A is a table showing the format of a conventional SCSI-3 extended copy command parameter list.

The format of a SCSI-3 extended copy command parameter list is shown in FIG. 2A by reference numeral 20. Among other things, it includes a list of target descriptors 22, a list of segment descriptors 24 and inline data 26. The target descriptors 22 identify the source and destination targets involved in the data transfer operation. The segment descriptors 24 identify the data to be transferred for each source and destination target, including the number of blocks to read and write, the number of bytes to process, and the nature of the processing. The inline data 26 represents meta data that is inserted in the data transferred between the source and destination devices.

Figure 2B:
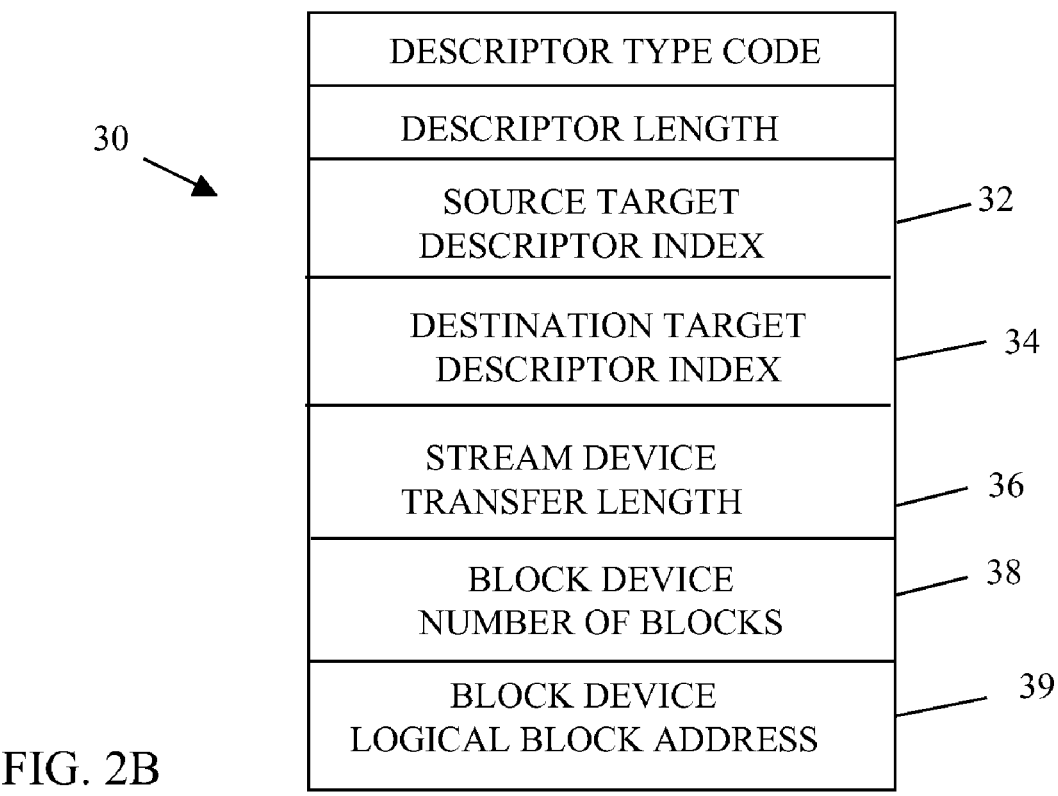
FIG. 2B is a table showing the format of a conventional SCSI-3 extended copy command segment descriptor (copy order) for transferring customer data from a block device to a streaming device.
Figure 2C:
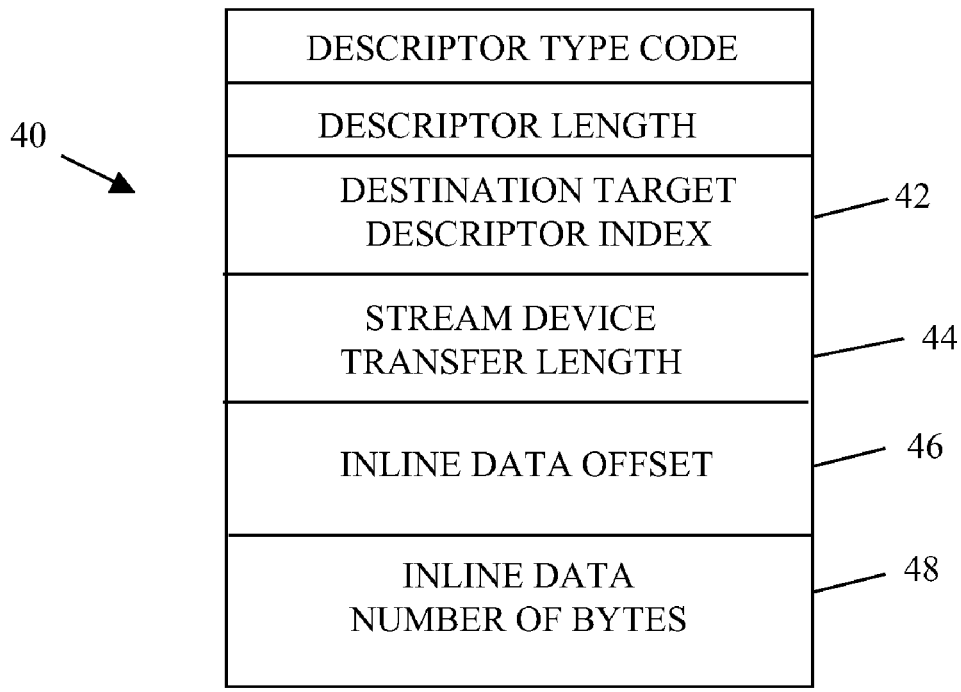
FIG. 2C is a table showing the format of a conventional SCSI-3 extended copy command segment descriptor (copy order) for transferring inline data to a streaming device.

FIG. 2B shows an exemplary SCSI-3 extended copy command segment descriptor 30. In order to facilitate understanding of a subsequent example illustrating operation of the invention, the segment descriptor 30 has been selected to show a data transfer between a block device, such as a disk drive, and a streaming device, such as a tape drive. The (block/streaming) segment descriptor 30 identifies the source target at 32, the destination target at 34, the stream device transfer length at 36, the block device number of blocks at 38, and the block device logical block address (data locating information) at 39. FIG. 2C shows an exemplary segment descriptor 40 for a transfer of inline data to a streaming device, and is again selected to facilitate understanding of the example set forth subsequently in this document. Note that the inline/stream segment descriptor 40 identifies the destination target at 42, the stream device transfer length at 44, the inline data offset (data locating information) 46, and the number of inline data bytes 48. Other segment descriptors may be used for other types of data transfers using the SCSI extended copy command, as is well known in the art.

The segment descriptors specified in a SCSI-3 extended copy command are sometimes referred to as copy orders. As can be seen from FIGS. 2B and 2C, each copy order requires knowledge of a source target and a destination target. However, as indicated by way of background above, it is sometimes the case that the software responsible for generating the SCSI-3 extended copy command consists of separate software having knowledge of only one target. For example, in the TIVOLI® Storage manager, data transfer requests may be handled using separate execution process threads for respectively processing the source and destination target data. This situation requires additional overhead processing to coordinate the efforts of the separate software so that the copy orders may be prepared. In addition, it is difficult to provide data transformations such as compression, encryption and check data generation because the transformations for each source and destination target usually cannot be specified separately due to differences in the way each target handles such manipulations.

The solution provided by the present invention is to allow data transfers for the source and destination targets to be specified separately by the separate software, and to use virtual targets as intermediate consumers and suppliers of data transferred between the real device targets. A virtual target does not correspond to a particular real device, but represents a temporary holding site for data. Nonetheless, the virtual target is treated as if it were a real device, first as a destination target in one copy order transferring data from a real source target and later as a source target in another copy order transferring data to a real destination target. The concept of an "abstract copy order" or "ACO" is also introduced as a vehicle to describe a copy order that may represent a data transfer between a real device and a virtual target, or between one virtual target and another virtual target. ACOs may also be referred to as virtual copy orders, because their purpose is not to execute actual data transfers between real devices. In a SCSI-3 implementation of the invention, an ACO may be similar in all respects to a conventional copy order used in a SCSI-3 extended copy command, but with a virtual target being specified instead of a real device. For convenience, conventional copy orders that involve only real devices will be referred to hereinafter as concrete copy orders or "CCOs." CCOs may also be referred to as real copy orders because they are used to execute actual data transfers between real devices. As described in more detail below, it is sometimes the case that during the process of converting ACOs to CCOs, it is possible for ACOs involving virtual devices to be combined into derivative ACOs that involve only real devices. Such ACOs are only temporary processing entities that are directly converted into CCOs. In that sense, the real device ACOs still represent virtual data transfers because they are not executed per se. Only the CCOs produced from such ACOs are executed.

Virtual targets are used for two reasons. First, they allow ACOs for source and destination sides to be constructed separately. Second, when requested data operations do not begin and end on block boundaries on the source and destination targets, the SCSI-3 extended copy command presents complexities involving hidden state (data retained from one segment descriptor to the next). To encapsulate these complexities, ACOs are designed to begin and end on block boundaries so that no data is carried over implicitly from one ACO to the next.

Using the concept of virtual targets, it is possible for a "data supplier" software application having knowledge of a real source device to create a copy command that comprises ACOs for copying data from the source device to a virtual target. A "data consumer" software application having knowledge of a real destination device (which application may be a different program or reside on a different computer system) can likewise create a copy command that comprises ACOs for copying data from the virtual target to the destination device. By combining these commands and converting the ACOs to CCOs, the first problem associated with conventional server-free data transfer operations can be overcome. The fact that the data supplier application only needs to manage the real source data with the destination specified as a virtual target means that it can also specify the data transformations (i.e., compression, encryption, check data) to be used in the ACOs that it generates. The same is true for the data consumer application. Any differences in the data transformation schemes used by the actual real source and destination targets involved in the data transfer can be handled using the virtual targets as intermediaries. This solves the second problem associated with conventional server-free data transfer operations.

One exemplary virtual target that may be used in accordance with the present invention is a virtual unbounded FIFO (First-In, First-Out) buffer. A typical use will be for all source data to be supplied into one virtual FIFO, and then for all destination data to be derived from the same virtual FIFO. Alternatively, there may also be cases where it is useful to reference more than one virtual FIFO. For example, the source data could be supplied to the first virtual FIFO, then transferred to a second virtual FIFO, and all destination data may be derived from the second virtual FIFO.

Figure 5:
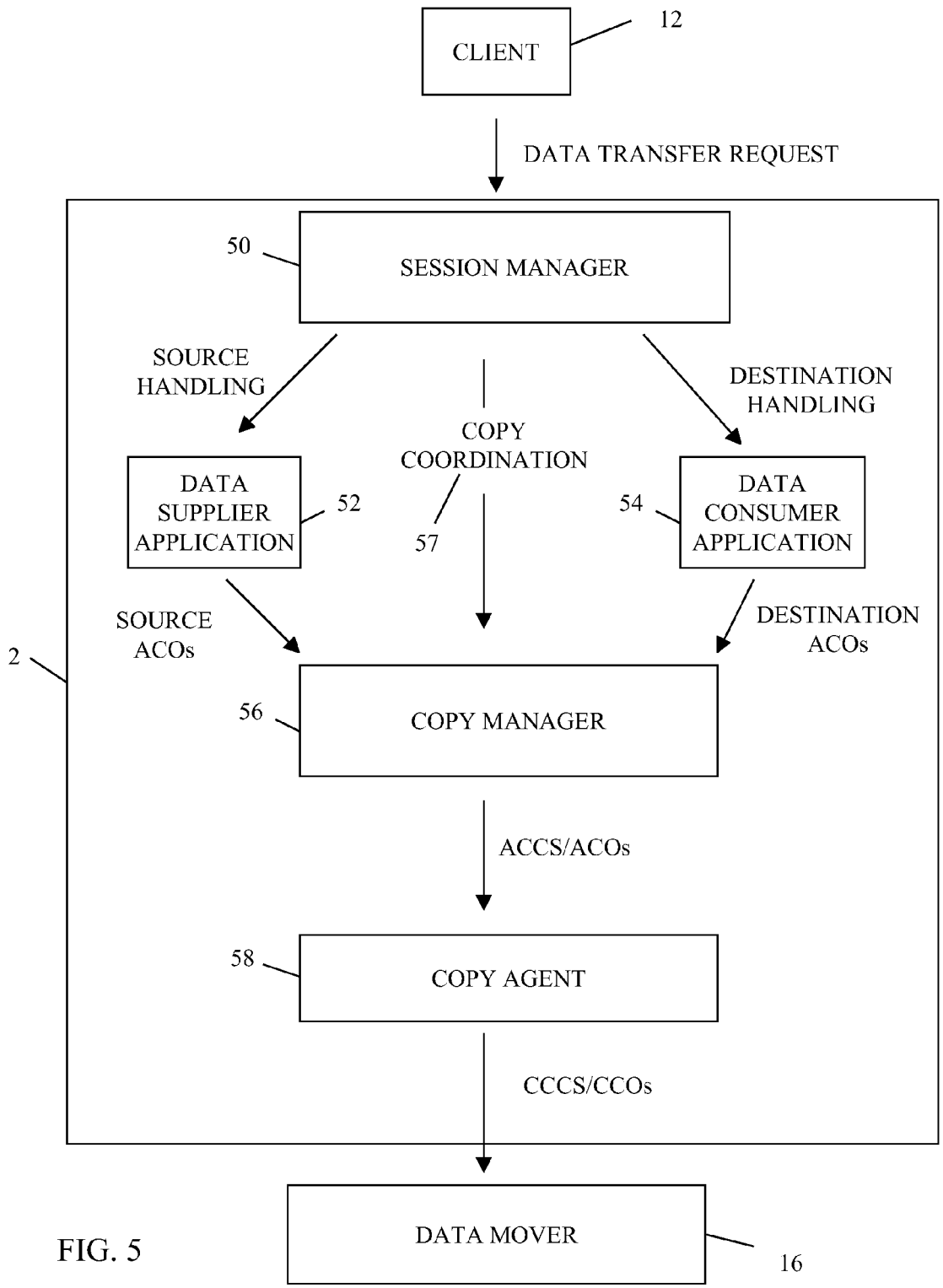
FIG. 5 is a functional block diagram showing a storage manager server configured for server-free data transfer operations in accordance with the invention.

Turning now to FIG. 5, the components of the storage manager server 2 that are responsible for generating and processing the ACOs used for data transfer operations are shown. A session manager 50, which is conventional in design and operation, is adapted to receive data transfer requests (e.g., backup, archive or migration requests) from LAN hosts such as the client system 12. In response to a data transfer request, the session manager 50 generates two session process threads that separately invoke a data supplier application 52 and a data consumer application 54 for handling the data transfer request. The data supplier application 52 has knowledge of the real source device involved in the data transfer request and is adapted to generate source ACOs for transferring data from the source device to a virtual FIFO. The data consumer application 54 likewise has knowledge of the real destination device involved in the data transfer request and is adapted to generate source ACOs for transferring data from a virtual FIFO to the destination device. A copy manager 56 receives the source ACOs and the destination ACOs. Using copy coordination information 57 provided by the session manager 50, such as session-identifying tokens, the copy manager 56 is adapted to generate "abstract copy commands" or "ACCs" that join the source and destination ACOs associated with the data transfer request. In a SCSI-3 implementation of the invention, an ACC may be identical in all respects to a conventional SCSI-3 extended copy command except that it involves transfers to and from virtual FIFOs. This will typically include client data as well as inline data (e.g., control and literal information). A copy agent 58 receives the ACCs from the copy manager 56. The copy agent's job is to translate each ACC with its associated ACOs so as to generate one or more corresponding "concrete copy command" or "CCC" with associated CCOs. If the ACCs represent SCSI-3 extended copy commands that involve virtual FIFOs, the CCCs will be standard SCSI-3 extended copy commands that involve only real devices. It is the CCCs that are sent to the data mover 16 for execution in conventional fashion.

The defining characteristic of a virtual target (FIFO or otherwise) is that it defines an abstract capability for intermediate storage of data, without specifying a concrete service that provides the capability. It is the job of the copy agent 58 to find concrete actions and facilities to effect the specified results. A virtual FIFO buffer supports a strictly first-in, first-out streaming of bytes. It is used to facilitate the assembly of data from multiple sources into one output stream and/or the distribution of a stream to multiple output devices. By way of example, these results can be obtained using the intrinsic FIFO buffering of the SCSI-3 extended copy command (when CAT=1) and the copy agent's facility for explicitly addressing internal FIFO resources.

The defined behavior for the copy agent 58 regarding virtual FIFOs is to perform copy operations so that the data movements on real targets are the same as if a realization of each virtual FIFO were available as a real target and was used. This can be done by either removing references to virtual targets by combining ACOs that reference the same virtual target as source and as destination, or to use temporary storage inside or outside the copy agent 58 as a real target that approximates the virtual target's properties.

The preferred implementation principle used by the copy agent 58 is that ACOs which reference virtual FIFOs are held until a "supplier" ACO (which names a given virtual FIFO as the destination) can be matched to a corresponding "consumer" ACO (which names the same virtual FIFO as source). Once matched, the ACOs can ideally be implemented as one or more CCOs from the real source device to the real destination device. The sequential nature of a virtual FIFO implies that supplier ACOs are held in order of receipt and are combined with consumer ACOs when they become available. The copy agent's job would be simpler if it simply used real storage (like auxiliary disk space) to hold the contents of the virtual FIFO. Indeed, there are copy operations that can be specified using virtual FIFOs that cannot be achieved using simple implementations of SCSI-3 extended copy unless separate intermediate storage is used (for example, copying blocks from tape to tape in a different order). However, it is a goal of the present invention to minimize the use of auxiliary storage because of its performance implications. Thus, the copy agent 58 attempts to hold the ACOs without actually transferring data until they can be combined into source-to-destination CCOs.

Figure 3:
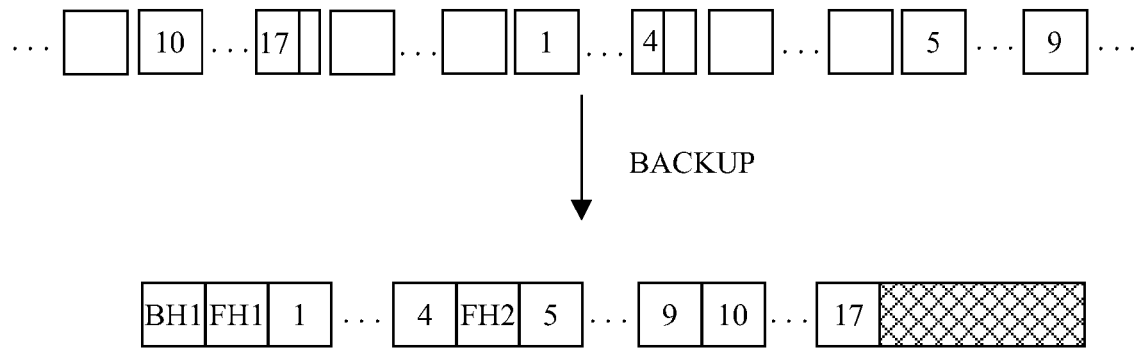
FIG. 3 is a diagram showing a data backup operation using virtual FIFOs.
Figure 4:
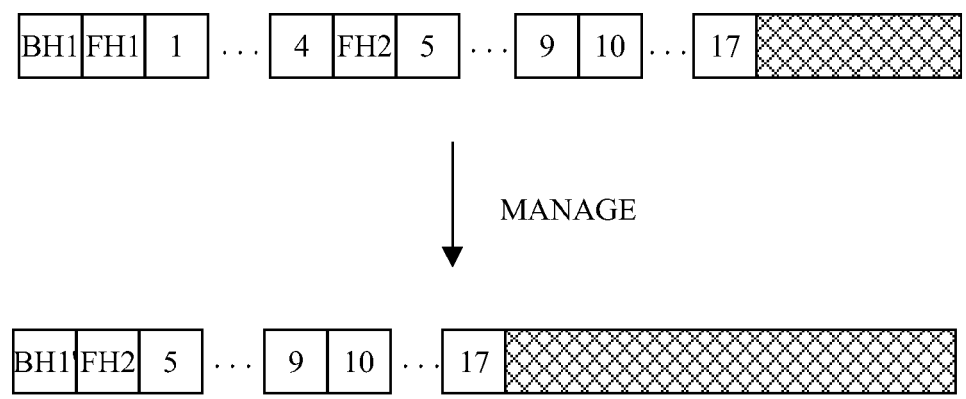
FIG. 4 is a diagram showing a data management operation using virtual FIFOs.

FIGS. 3 and 4 illustrate how virtual FIFOs can be used for data backup and management operations, respectively. In the data backup operation of FIG. 3, disk blocks (512 bytes each) from two files of size 1800 bytes and 6300 bytes, respectively, are to be backed up to tape (64 KB record size). Literal (meta) data representing a backup header (BH1) and file headers (FH1 and FH2) are also inserted on the tape. The following ordered ACOs can be generated to implement the data backup operation using two virtual FIFOs (FIFO A and FIFO B) (not shown):

Whole disk blocks to FIFO A: (File1=4 blocks labeled "1-4"; File2=13 blocks labeled "5-9" and "10-17")
    Literal to FIFO B: BH1, FH1
    FIFO A to FIFO B (File1=1800 bytes)
    FIFO A to discard (248 bytes [=(4*512)−1800])
    Literal to FIFO B: FH2
    FIFO A to FIFO B (6300 bytes)
    D FIFO A to discard (356 bytes [=(13*512)−6300])
    FIFO B to tape (with padding)

In the data management operation of FIG. 4, the file identified by FH1 is to be removed from the tape. The following ordered ACOs can be generated to implement the data management operation using two virtual FIFOs (FIFO A and FIFO B) (not shown):

Tape block to FIFO A (full record)
    Literal to FIFO B: BH1☐
    FIFO A to discard (BH1, FH1, file 1 data)
    FIFO A to FIFO B (FH2 size+6300 bytes)
    FIFO B to tape (with padding)
    Clear FIFO A Although the foregoing operations are relatively straightforward, such operations can become complex, for two reasons: byte order and granularity. First, ACO order implies a byte order that must be preserved. When FIFO-to-FIFO transfers are permitted, the head-of-queue consumer ACO (x) for one FIFO (A) may be a supplier ACO for another FIFO (B), and may be queued behind a different supplier ACO (w). Then ACO (x) cannot be performed until ACO (w) is performed. It could happen, however, that the order requirement on another device implies that ACO (w) also cannot precede ACO (x). This deadlock (which occurs exactly in a reordered-block tape copy) must be broken by using intermediate storage to break some ACO (say, x) into components (x1, x2) so that the correct end result is obtained in the ACO order (x1, w, x2). Enforcing the byte order, and detecting and breaking deadlocks that could arise, are the first design challenge. The granularity challenge is that whole blocks must be read and written on disk and tape devices, whereas arbitrary byte lengths can be chosen for FIFO-to-FIFO operations. A combination of ACOs thus can require that part of a block read from tape will be directed (through one or more FIFOs) into part of a block on one destination device, and the remainder will be used elsewhere.

This is a key value of using virtual FIFOs. The copy agent 58 encapsulates the complications of this granularity constraint. The result is that, when data is read, partial results may be left in the internal buffers of the data mover 16. When the copy agent 58 produces CCOs, it must determine and take into account what data will be in those buffers when the CCOs are executed.

The procedure implemented by the copy agent 58 attempts to resolve these issues and translate a sequence of ACOs into a corresponding sequence of CCOs. The overall strategy is to read the sequence of ACOs and build a set of queues of ACOs that reflects the constraints on reordering. Groups of ACOs are dequeued as soon as possible to emit CCOs, i.e., to define the parameter of each CCO and append it to the output list for later execution. This is done in transformation steps that replace one or more ACOs with a set of CCOs and ACOs that yield the same result. Some transformations produce no CCOs, but adjust the ACOs to make translation into CCOs easier or possible. The transformations that emit CCOs may also produce new ACOs that follow the emitted CCOs to make the combination equivalent to the original ACO set. This is typical when granularity mismatch causes residual data to be left in internal buffers of the data mover 16. Once CCOs are emitted, their side effects are determined as if they have executed. The CCOs, once emitted, are not modified.

Figure 6:
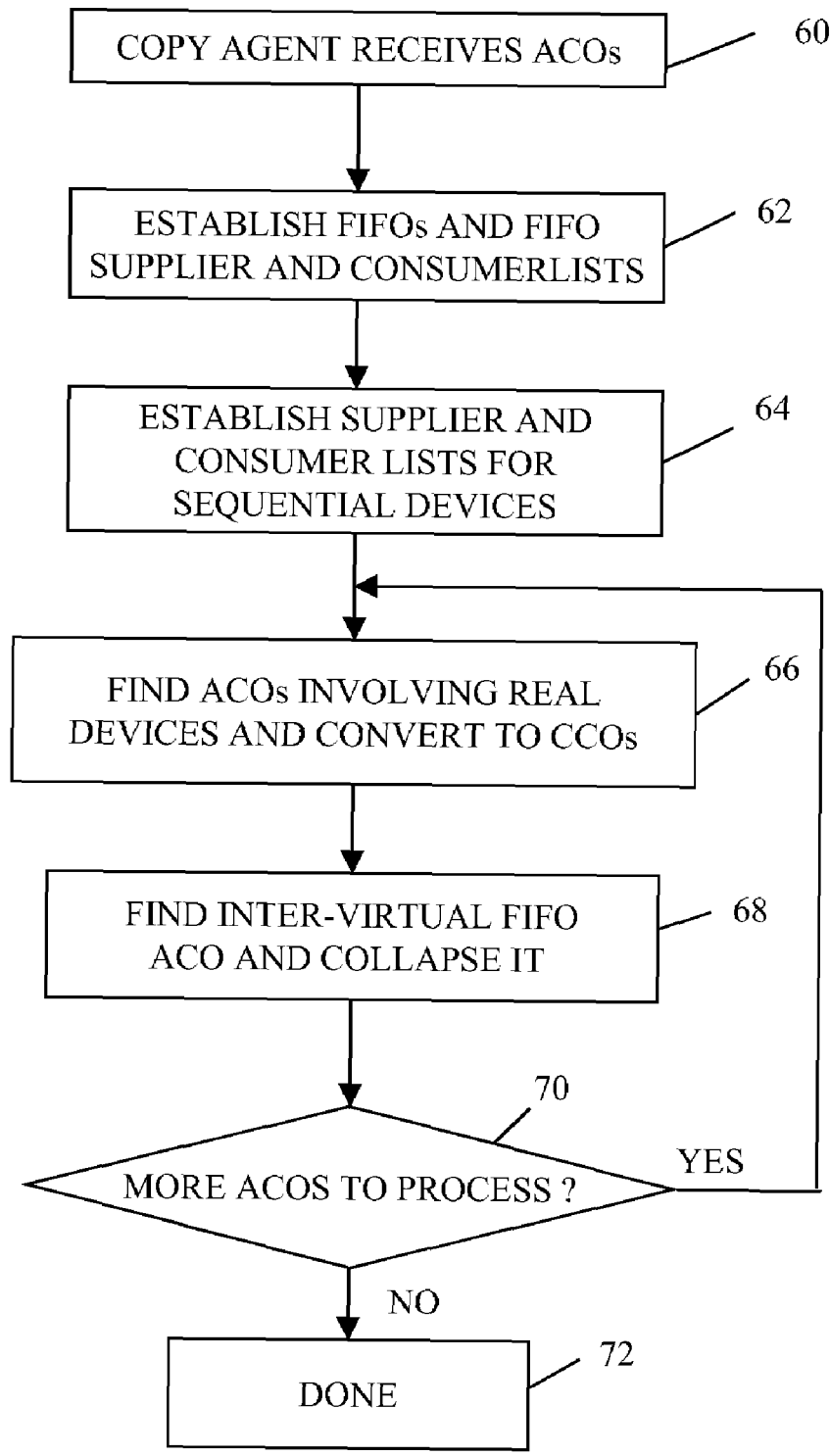
FIG. 6 is a flow diagram showing processing steps performed to convert abstract copy orders to concrete copy orders in accordance with the invention.

Turning now to FIG. 6, the ACO-to-CCO translation process implemented by the copy agent 58 is illustrated in flow chart form. As stated, in processing an ACC, ACOs will be examined in sequence and each will be completed when possible by performing read and write operation to devices. This method will retain each ACO until all of the "supplier" ACOs that specify a virtual FIFO as destination can be combined with the corresponding "consumer" ACOs that specify the same virtual FIFO as source. As indicated, the combining of the supplier ACOs with consumer ACOs eliminates the needs for temporary storage.

The first step 60 shown in FIG. 6 is for the copy agent 58 to receive a set of ACOs from the copy manager 56. In step 62, the copy agent 58 defines the virtual FIFOs identified in the ACOs and establishes, for each virtual FIFO, separate lists of retained supplier ACOs and retained consumer ACOs. In step 64, the copy agent 58 establishes for each real sequential device (such as tape) used as a source, a list of supplier ACOs, and for each real sequential device used as a destination, a list of consumer ACOs. All of these ACO lists are kept in the order in which the ACOs were examined. In step 66, the copy agent 58 looks for ACOs representing transfers between real devices. If possible, these are converted into CCOs. In step 68, the copy agent 58 looks for ACOs representing transfers between virtual FIFOs. These are collapsed into ACOs involving real devices and then, in step 70, control is returned to step 66 if there are more ACOs to process.

Figure 7:
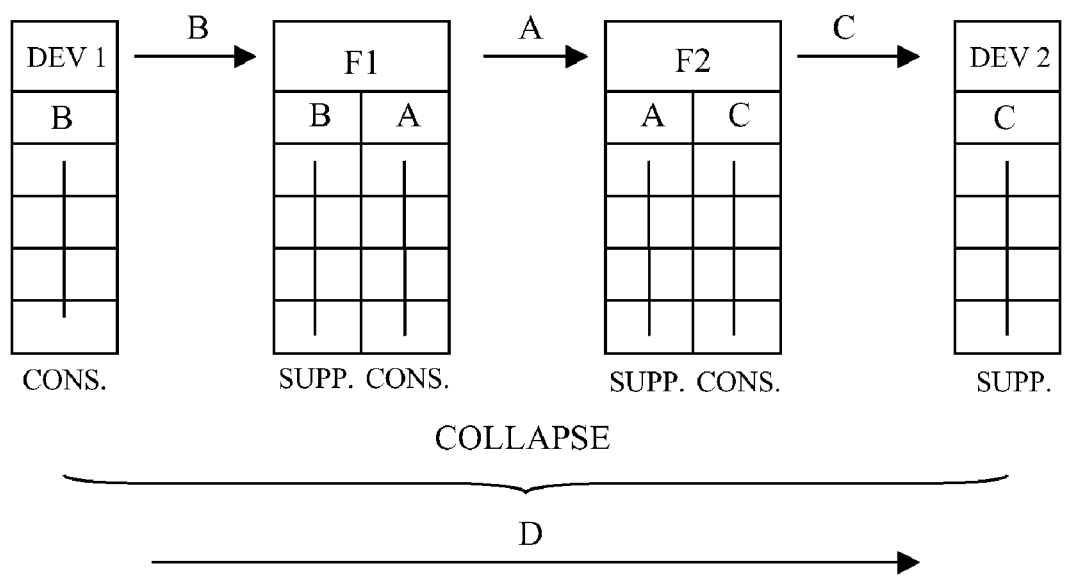
FIG. 7 is a diagrammatic representation of virtual FIFOs that may be used to implement server-free data transfers in accordance with the invention.

An inter-virtual FIFO transfer is indicated when an ACO appears on two lists associated with different virtual FIFOs, such as a consumer list for a first virtual FIFO representing the ACO's source target and a supplier list for a second virtual FIFO representing the ACO's destination target. This indicates an inter-virtual FIFO transaction whose elimination will facilitate the overall goal of reducing ACOs to CCOs. When a first ACO appearing on a first virtual FIFO's consumer list and a second virtual FIFO's supplier list is detected, the copy agent 58 attempts, in step 68, to eliminate the first ACO by processing a second ACO at the head of the first virtual FIFO's supplier list and a third ACO at the head of the second virtual FIFO's consumer list, if possible. FIG. 7 is illustrative. It shows a first ACO A representing a data transfer between a first virtual FIFO F1 and a second virtual FIFO F2. The ACO A thus appears on the consumer list of the virtual FIFO F1 and the supplier list of the virtual FIFO F2. A second ACO B represents a transfer from a real device DEV1 to the virtual FIFO F1. A third ACO C represents a transfer from the virtual FIFO F2 to a real device DEV2. The copy agent 58 collapses the ACO A by attempting to replace it with a new ACO D representing a transfer between DEV1 and DEV2, which may then be directly converted into a CCO.

Note that ACOs will typically have different data lengths. In some cases, a larger ACO order can be split into two ACOs so that the lengths can match. In other cases, an ACO cannot be split but its data will be read in and held in an intermediate buffer. This is part of the process performed in step 66 of FIG. 6. The details of how ACOs are combined is dependent on the capabilities of the data mover 16 and also depends on the nature of the real source device (tape or disk). However, the ultimate goal is to keep reducing the ACOs using the foregoing procedure until only CCOs remain. When, in step 70 of FIG. 6, it is determined that ACOs have been processed, control passes to step 72 and the procedure terminates.

EXAMPLE

Following is an example of an ACO-to-CCO conversion for a backup of data from a disk device to a tape device. The designations A, B, C, D . . . are used to represent the names of ACOs. The designations F1, F2, F3, F4 are used to represent the names of virtual FIFOs. Note that it also desired to insert meta data in between the disk data and then backup the resultant data to tape. Assume that the copy manager 56 provides the copy agent 58 with the following set of ACOs:

ACO Set Received From Copy Manager

| | |
|---|---|
| A: disk –> F1 | read in 0x60000 bytes customer data from disk to F1 |
| B: lit –> F2 | 0x174 bytes meta data1 provided to F2 |
| C: lit –> F3 | 0x80 bytes meta data2 provided to F3 |
| D: F3 –> F4 | move 0x20 bytes meta data2 from F3 to F4 |
| E: F2 –> F4 | move 0x174 bytes meta data1 from F2 to F4 |
| F: F1 –> F4 | move 0x3FE6C bytes customer data from F1 to F4 |
| G: F3 –> F4 | move 0x20 bytes meta data2 from F3 to F4 |
| H: F1 –> F4 | move 0x1FFE0 bytes customer data from F1 to F4 |
| I: F3 –> F4 | move 0x20 bytes meta data2 from F3 to F4 |
| J: F1 –> F4 | move 0x1B4 bytes customer data from F1 to F4 |
| K: F3 –> F4 | move 0x20 bytes meta data2 from F1 to F4 |
| L: F4 –> tape | write 0x60000 customer data from F4 to tape |
| M: F4 –> tape | write 0x1F4 bytes from F4 to tape |

Note that the data supplier application 52 of FIG. 5 will generate all ACOs involving data transfers from a real device to a virtual FIFO, namely ACOs A, B and C. The data consumer application 54 of FIG. 5 will generate all ACOs involving data transfers from a virtual FIFO to a real device, namely ACOs L and M. The copy manager 56 of FIG. 5, as part of its function of combining the ACOs produced by the data supplier application 52 and the data consumer application 54, and in order to insert meta data, will generate the ACOs involving data transfers between virtual FIFOs, namely, ACOs D, E, F, G, H, I, J and K.

Figure 8:
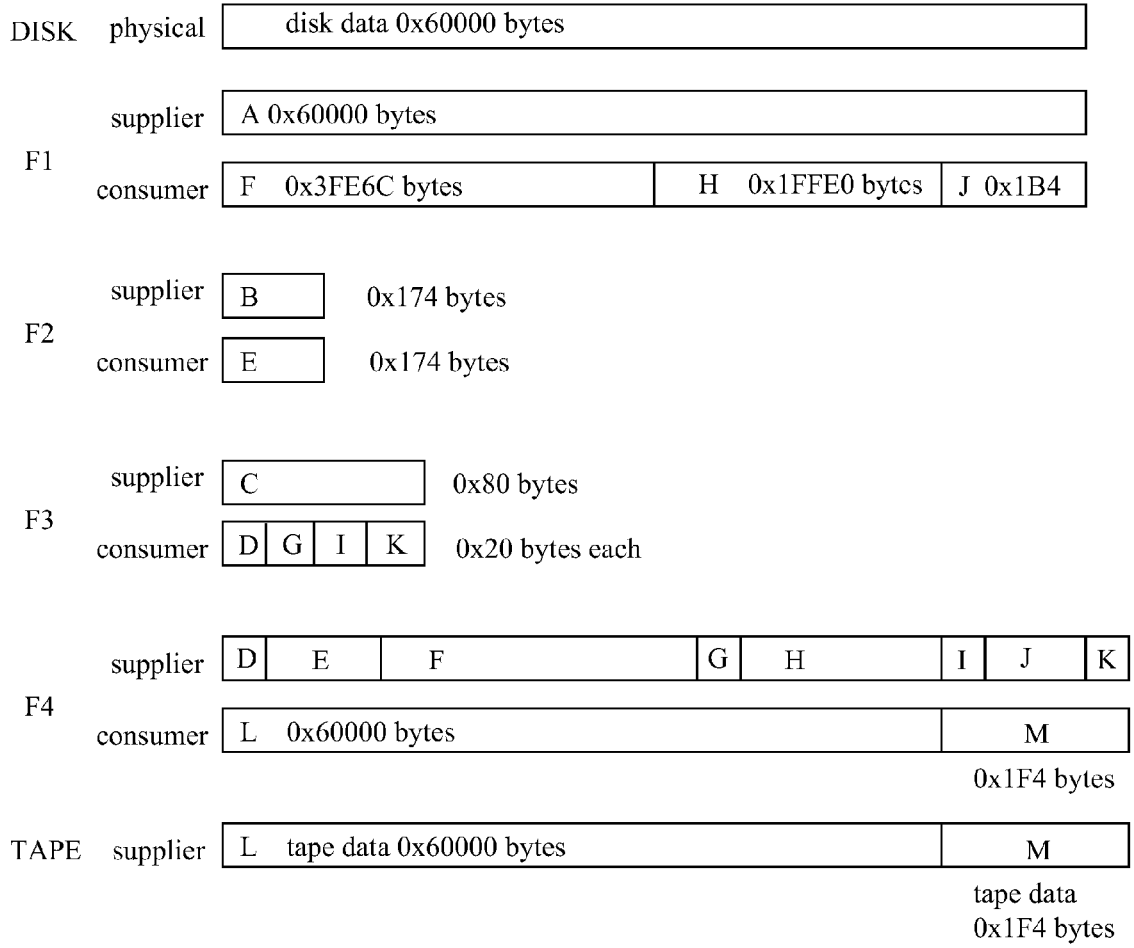
FIGS. 8-19 are diagrammatic representations of abstract copy order supplier and consumer lists as abstract copy orders are converted to concrete copy orders in accordance with an exemplary implementation of the invention.

The processing procedure implemented by the copy agent 58 enqueues the above ACOs to the tape consumer list, the FIFO consumer lists and the FIFO supplier lists. These ACOs are put on the various lists in the order of their examination. Because the source disk is a direct access device, the sequence of execution is not important and there is no need for a consumer list for that device. The ACO lists, which are shown in graphical form in FIG. 8, are as follows:

| | | | | | | | |
|---|---|---|---|---|---|---|---|
| F1 supplier list: | A | | | | | | |
| F1 consumer list: | F | H | J | | | | |
| F2 supplier list: | B | | | | | | |
| F2 consumer list: | E | | | | | | |
| F3 supplier list: | C | | | | | | |
| F3 consumer list: | D | G | I | K | | | |
| F4 supplier list: | D | E | F | G | H | I | J K |
| F4 consumer list: | L | M | | | | | |
| Destination tape supplier list: | L | M | | | | | |

Note that there are no ACOs specifying data transfers between real devices. Thus, the copy agent processing procedure will select ACOs that transfer from one virtual FIFO to another, and attempt to reduce each such ACO to an ACO involving real devices, followed by conversion to a CCO. Note that ACOs D-K of the ACO set received from the copy manager 56 involve inter-FIFO transfers. ACO D is a transfer from F3 to F4 and is at the head of the F3 consumer list and the F4 supplier list. It will also be seen that ACO C is at the head of the F3 supplier list and that ACO L is at the head of the F4 consumer list. Thus, the processing procedure attempts to resolve ACO D into a transfer involving the ACOs C and L. The byte blocks of C, D, and L to be processed are as follows:

C=0x80 bytes
D=0x20 bytes
L=0x60000 bytes

Note that C>D. Thus, C will be split into C1 and C2, where:

C1=0x20 bytes
C2=0x60 bytes

The ACO lists will now be:

| | | | | | | | |
|---|---|---|---|---|---|---|---|
| F1 supplier list: | A | | | | | | |
| F1 consumer list: | F | H | J | | | | |
| F2 supplier list: | B | | | | | | |
| F2 consumer list: | E | | | | | | |
| F3 supplier list: | C1 | C2 | | | | | |
| F3 consumer list: | D | G | I | K | | | |
| F4 supplier list: | D | E | F | G | H | I | J K |
| F4 consumer list: | L | M | | | | | |
| Destination tape supplier list: | L | M | | | | | |

Now, the processing procedure will select the combination of C1, D, and L to be processed.

C1=0x20 bytes
D=0x210 bytes
L=0x60000 bytes

The processing procedure will collapse C1, D and L to be C1D and L. This will eliminate the inter-FIFO operation of ACO D and replace it with C1D, which is interpreted as:

C1D: lit→F4 0x20 bytes meta data2 provided to F4.

The byte blocks of C1D and L to be processed are as follows:

C1D=0x20 bytes (C1D has a REAL source and virtual FIFO destination)
L=0x60000 bytes The total byte size transferred under CD1 is 0x20 bytes, which is less than the destination tape block size of L. The ACO L will not be split.

The ACO lists will now be:

| | | | | | | | |
|---|---|---|---|---|---|---|---|
| F1 supplier list: | A | | | | | | |
| F1 consumer list: | F | H | J | | | | |
| F2 supplier list: | B | | | | | | |
| F2 consumer list: | E | | | | | | |
| F3 supplier list: | C2 | | | | | | |
| F3 consumer list: | G | I | K | | | | |
| F4 supplier list: | C1D | E | F | G | H | I | J K |
| F4 consumer list: | L | M | | | | | |
| Destination tape supplier list: | L | M | | | | | |

At this time, the ACOs C1D and L are operations which have a real source (meta data) and a real destination (tape device). The copy agent 58 is able to produce one CCO for the data mover 16 to perform by reading 0x20 bytes of meta data2 and moving it to the data mover's destination buffer. The ACO C1D can be removed at the end of this operation.

Figure 9:
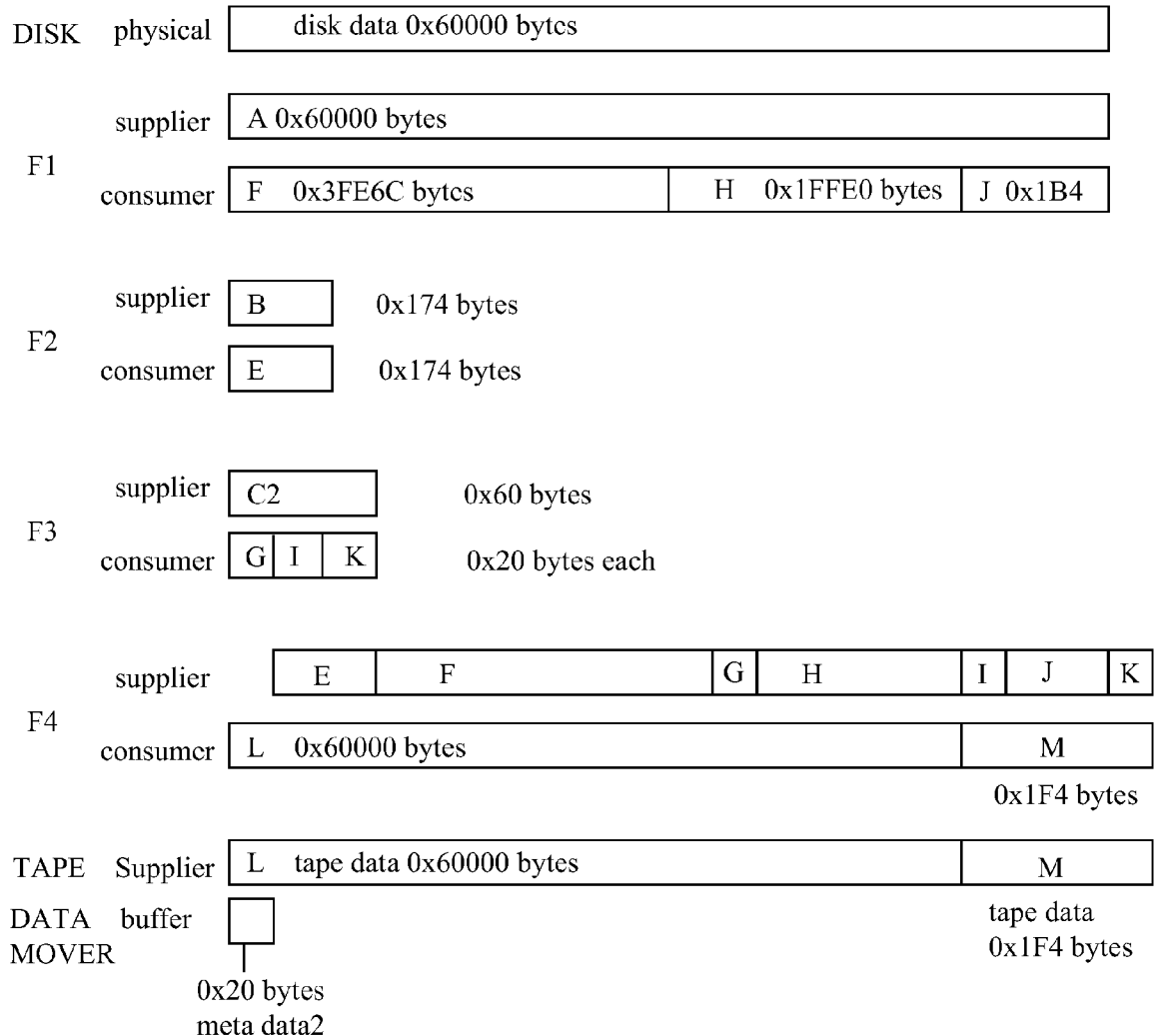

As shown in FIG. 9, the ACO lists will now be:

| | | | | | | | |
|---|---|---|---|---|---|---|---|
| F1 supplier list: | A | | | | | | |
| F1 consumer list: | F | H | J | | | | |
| F2 supplier list: | B | | | | | | |
| F2 consumer list: | E | | | | | | |
| F3 supplier list: | C2 | | | | | | |
| F3 consumer list: | G | I | K | | | | |
| F4 supplier list: | E | F | G | H | I | J | K |
| F4 consumer list: | L | M | | | | | |
| Destination tape supplier list: | L | M | | | | | |

Data Mover Destination Buffer=0x20 bytes

Now, the processing procedure will select the next ACO that transfers from one virtual FIFO to another, and attempt to reduce it to an ACO involving real devices, followed by conversion to a CCO. From the ACO set enumerated above, it will be seen that ACO E is the next ACO involving an inter-FIFO transfer. It is a transfer from F2 to F4 and is at the head of the F2 consumer list and the F4 supplier list. It will also be seen that ACO B is at the head of the F2 supplier list and that ACO L is at the head of the F4 consumer list. Thus, the processing procedure attempts to resolve ACO E into a transfer involving the ACOs B and L. The byte blocks of B, E, and L to be processed are as follows:

B=0x174 bytes
E=0x174 bytes
L=0x60000 bytes

The processing procedure will collapse B, E and L to be BE and L. This will eliminate the inter-FIFO operation of ACO E and replace it with BE, which is interpreted as:

BE: lit→F4 0x174 bytes meta data1 provided to F4.

The byte blocks of BE and L to be processed are as follows:

BE=0x174 bytes where BE has a REAL source and virtual FIFO destination
L=0x60000 bytes The total bytes in ACO BE is 0x174 bytes and is less than the destination tape block size.

The ACO L will not be split.

The ACO lists will now be:

| F1 supplier list: | A | | | | | |
|---|---|---|---|---|---|---|
| F1 consumer list: | F | H | J | | | |
| F3 supplier list: | C2 | | | | | |
| F3 consumer list: | G | I | K | | | |
| F4 supplier list: | BE | F | G | H | I J | K |
| F4 consumer list: | L | M | | | | |
| Destination tape supplier list: | L | M | | | | |

Data Mover Destination Buffer=0x20 bytes

At this time, the ACOs BE and L are operations that have real source (meta data) and a real destination (tape device). The copy agent 58 is thus able to produce one CCO for the data mover 16 to perform by reading 0x174 bytes of meta data1 and moving it to the data mover's destination buffer, such that Data Mover Destination buffer=0x20 bytes+0x174 bytes=0x194 bytes. The copy agent then removes the ACO BE at the end of this operation.

Figure 10:
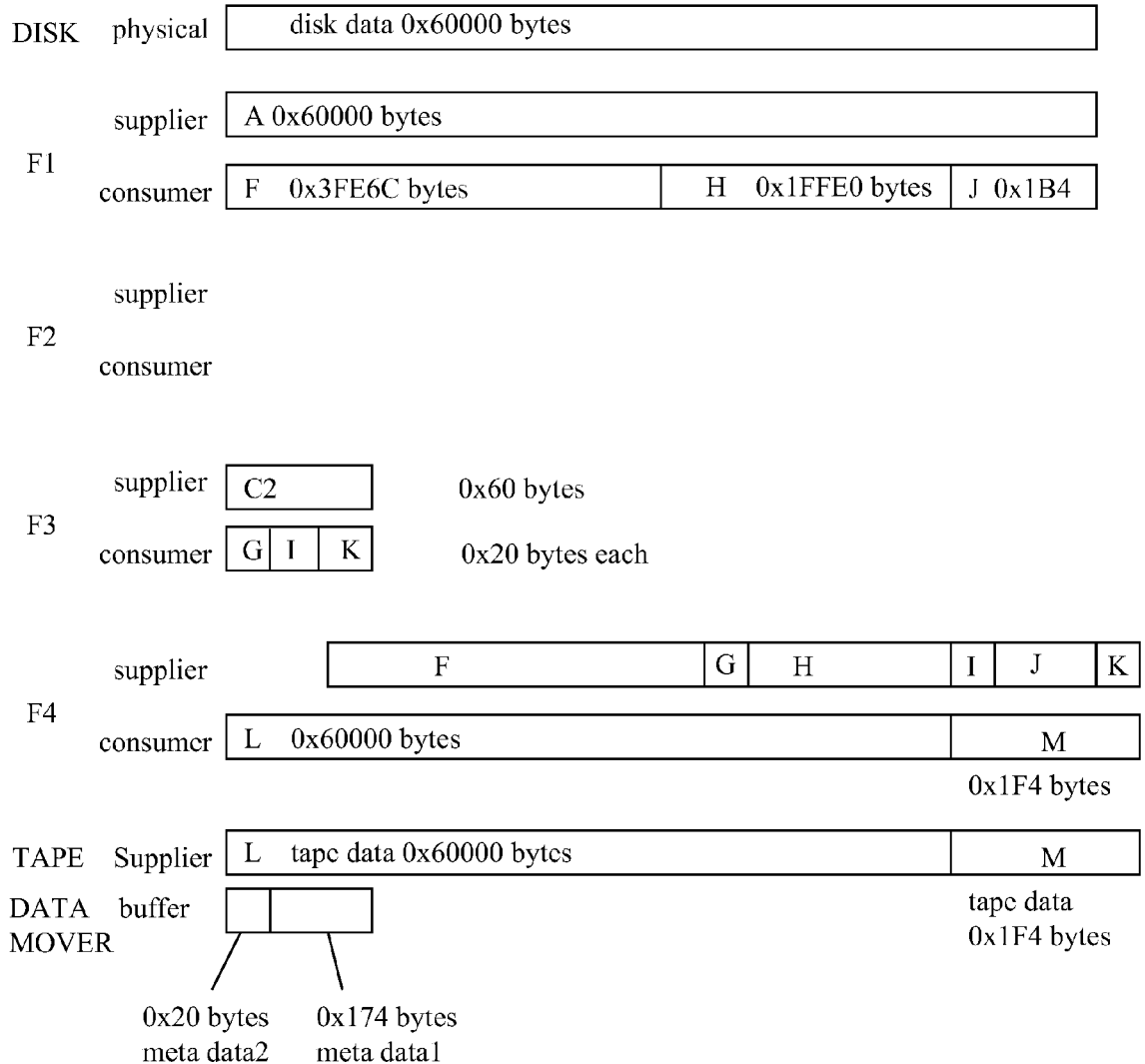

As shown in FIG. 10, the ACO lists will now be:

| F1 supplier list: | A | | | | | |
|---|---|---|---|---|---|---|
| F1 consumer list: | F | H | J | | | |
| F3 supplier list: | C2 | | | | | |
| F3 consumer list: | G | I | K | | | |
| F4 supplier list: | F | G | H | I | J | K |
| F4 consumer list: | L | M | | | | |
| Destination tape supplier list: | L | M | | | | |

Data Mover Destination Buffer=0x194 bytes

Now, the processing procedure will select the next ACO that transfers from one virtual FIFO to another, and attempt to reduce it to an ACO involving real devices, followed by conversion to a CCO. From the ACO set enumerated above, it will be seen that ACO F is the next ACO involving an inter-FIFO transfer. It is a transfer from F1 to F4 and is at the head of the F1 consumer list and the F4 supplier list. It will also be seen that ACO A is at the head of the F1 supplier list and that ACO L is at the head of the F4 consumer list. Thus, the processing procedure attempts to resolve ACO F into a transfer involving the ACOs A and L. The byte blocks of A, F, and L to be processed are as follows:

A=0x60000 bytes
F=0x3FE6C bytes
L=0x60000 bytes

Figure 11:
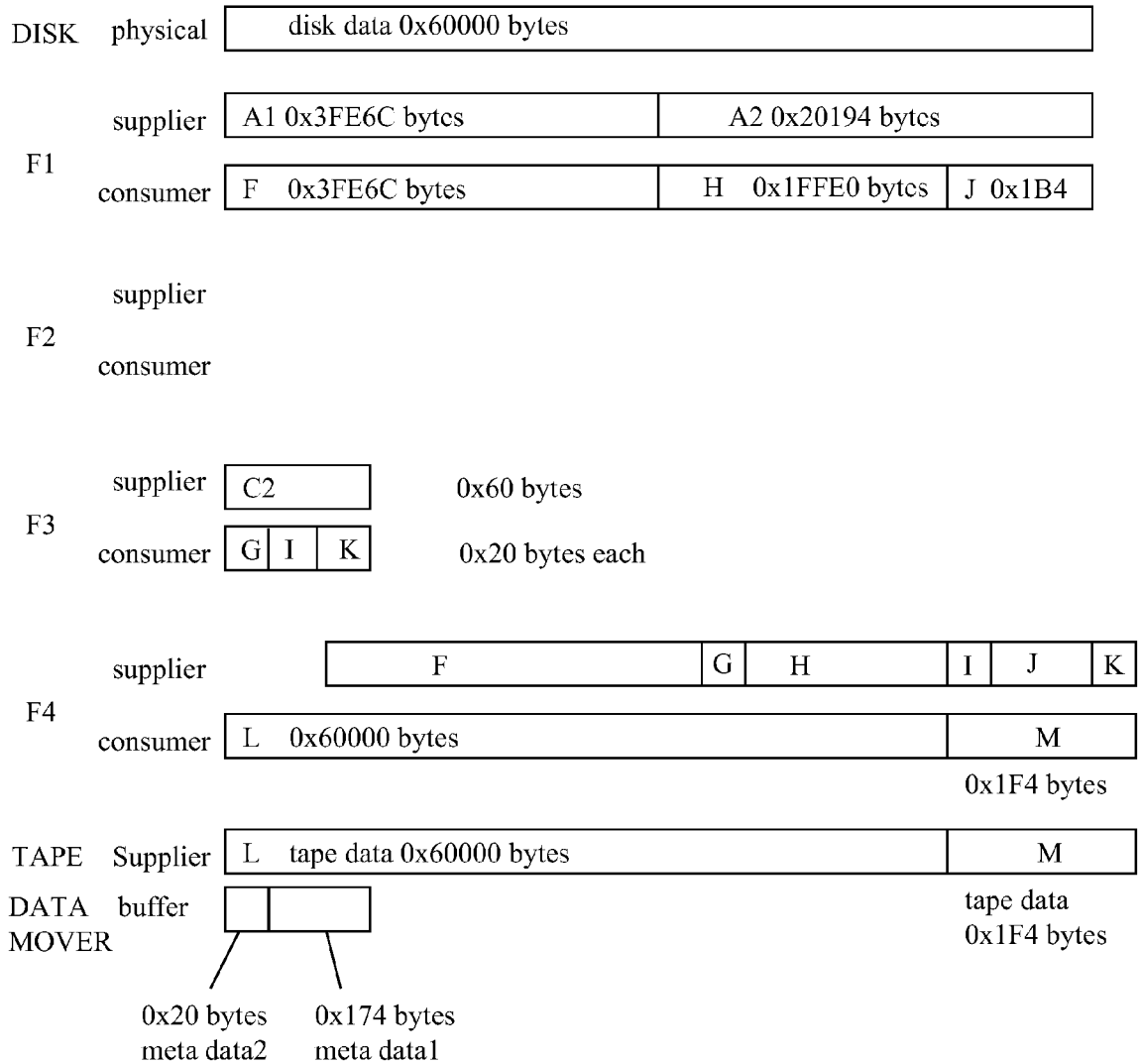

Note that A>F. Thus, A will be split into A1 and A2, where:
A1=0x3FE6C bytes
A2=0x20194 bytes As shown in FIG. 11, the ACO lists will now be:

| F1 supplier list: | A1 | A2 | | | | |
|---|---|---|---|---|---|---|
| F1 consumer list: | F | H | J | | | |
| F3 supplier list: | C2 | | | | | |
| F3 consumer list: | G | I | K | | | |
| F4 supplier list: | F | G | H | I | J | K |
| F4 consumer list: | L | M | | | | |
| Destination tape supplier list: | L | M | | | | |

Data Mover Destination Buffer=0x194 bytes

Now the copy agent processing procedure will select the combination of A1, F and L to be processed.
A1=0x3FE6C bytes
F=0x3FE6C bytes
L=0x60000 bytes The processing procedure will collapse A1, F and L to be A1F and L. This will eliminate the inter-FIFO operation of ACO F and replace it with A1F, which is interpreted as:
A1F: disk→F4 read in 0x3FE6C bytes customer data from disk to F4.

The byte blocks of A1F and L to be processed are as follows:
A1F=0x3FE6C bytes, where A1F has a real source and virtual FIFO destination
L=0x60000 bytes The ACO lists will now be:

| F1 supplier list: | A2 | | | | | |
|---|---|---|---|---|---|---|
| F1 consumer list: | H | J | | | | |
| F3 supplier list: | C2 | | | | | |
| F3 consumer list: | G | I | K | | | |
| F4 supplier list: | A1F | G | H | I | J | K |
| F4 consumer list: | L | M | | | | |
| Destination tape supplier list: | L | M | | | | |

Data Mover Destination Buffer=0x194 bytes

Note that A1F<L. Thus, L will be split into L1 and L2, where:
L1=0x40000 bytes
L2=0x20000 bytes The ACO lists will now be:

| F1 supplier list: | A2 | | | | | |
|---|---|---|---|---|---|---|
| F1 consumer list: | H | J | | | | |
| F3 supplier list: | C2 | | | | | |
| F3 consumer list: | G | I | K | | | |
| F4 supplier list: | A1F | G | H | I | J | K |
| F4 consumer list: | L1 | L2 | M | | | |
| Destination tape supplier list: | L1 | L2 | M | | | |

Data Mover Destination Buffer=0x194 bytes

At this time, the ACOs A1F and L1 are operations which have a real source (disk device) and a real destination (tape device). The copy agent 58 is thus able to produce one CCO for the data mover 16 to perform by reading 0x3FE6C bytes of data from the source disk and first moving the data in the data mover's destination buffer (0x194 bytes) and then moving the disk data (0x3FE6C bytes) to the destination tape device (total tape data written is 0x194+0x3FE6C=0x40000 bytes). The copy agent 58 can then remove the ACO's A1F and L1 at the end of this operation.

Figure 12:
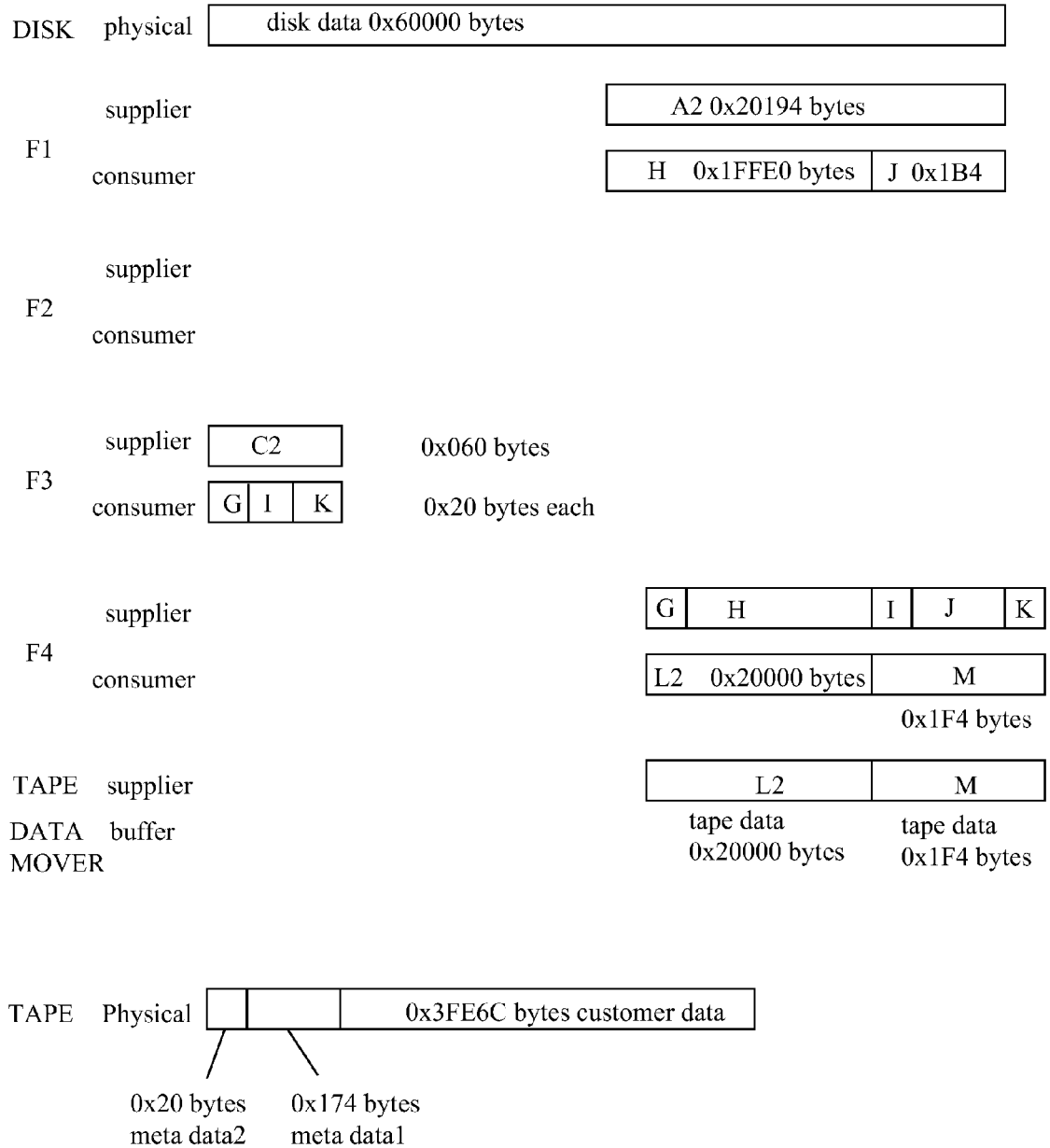

As shown in FIG. 12, the ACO lists will now be:

| F1 supplier list: | A2 | | | | | |
|---|---|---|---|---|---|---|
| F1 consumer list: | H | J | | | | |
| F3 supplier list: | C2 | | | | | |
| F3 consumer list: | G | I | K | | | |
| F4 supplier list: | G | H | I | J | K | |
| F4 consumer list: | L2 | M | | | | |
| Destination tape supplier list: | L2 | M | | | | |

Now, the processing procedure will select the next ACO that transfers from one virtual FIFO to another, and attempt to reduce it to an ACO involving real devices, followed by conversion to a CCO. From the ACO set enumerated above, it will be seen that ACO G is the next ACO involving an inter-FIFO transfer. It is a transfer from F3 to F4 and is at the head of the F3 consumer list and the F4 supplier list. It will also be seen that ACO C2 is at the head of the F3 supplier list and that ACO L2 is at the head of the F4 consumer list. Thus, the processing procedure attempts to resolve ACO G into a transfer involving the ACOs C2 and L2. The byte blocks of C2, G, and L2 to be processed are as follows:

C2=0x60 bytes
G=0x20 bytes
L2=0x20000 bytes

Note that C2>G. Thus, C2 will be split into C3 and C4, where:
C3=0x20 bytes
C4=0x40 bytes The ACO lists will now be:

| | | | | | |
|---|---|---|---|---|---|
| F1 supplier list: | A2 | | | | |
| F1 consumer list: | H | J | | | |
| F3 supplier list: | C3 | C4 | | | |
| F3 consumer list: | G | I | K | | |
| F4 supplier list: | G | H | I | J | K |
| F4 consumer list: | L2 | M | | | |
| Destination tape supplier list: | L2 | M | | | |

Now, the processing procedure will select the combination of C3, G, and L2 to be processed:
C3=0x20 bytes
G=0x20 bytes
L2=0x20000 bytes The processing procedure will collapse C3, G and L2 to be C3G and L2. This will eliminate the inter-FIFO operation of ACO G and replace it with C3G, which is interpreted as:

C3G: lit→F4 0x20 bytes meta data2 provided to F4.

The byte blocks of C3G and L2 to be processed are as follows:
C3G=0x20 bytes, where C3G has a real source and a virtual FIFO destination
L2=0x20000 bytes The ACO lists will now be:

| | | | | | |
|---|---|---|---|---|---|
| F1 supplier list: | A2 | | | | |
| F1 consumer list: | H | J | | | |
| F3 supplier list: | C4 | | | | |
| F3 consumer list: | I | K | | | |
| F4 supplier list: | C3G | H | I | J | K |
| F4 consumer list: | L2 | M | | | |
| Destination tape supplier list: | L2 | M | | | |

At this time, the ACOs C3G and L2 are operations that have a real source (meta data) and a real destination (tape device). The copy agent 58 will produce one CCO for the data mover 16 to perform by reading 0x20 bytes of meta data2 and move it to the data mover's destination buffer. The copy agent 58 can then remove ACO C3G at the end of this operation.

Figure 13:
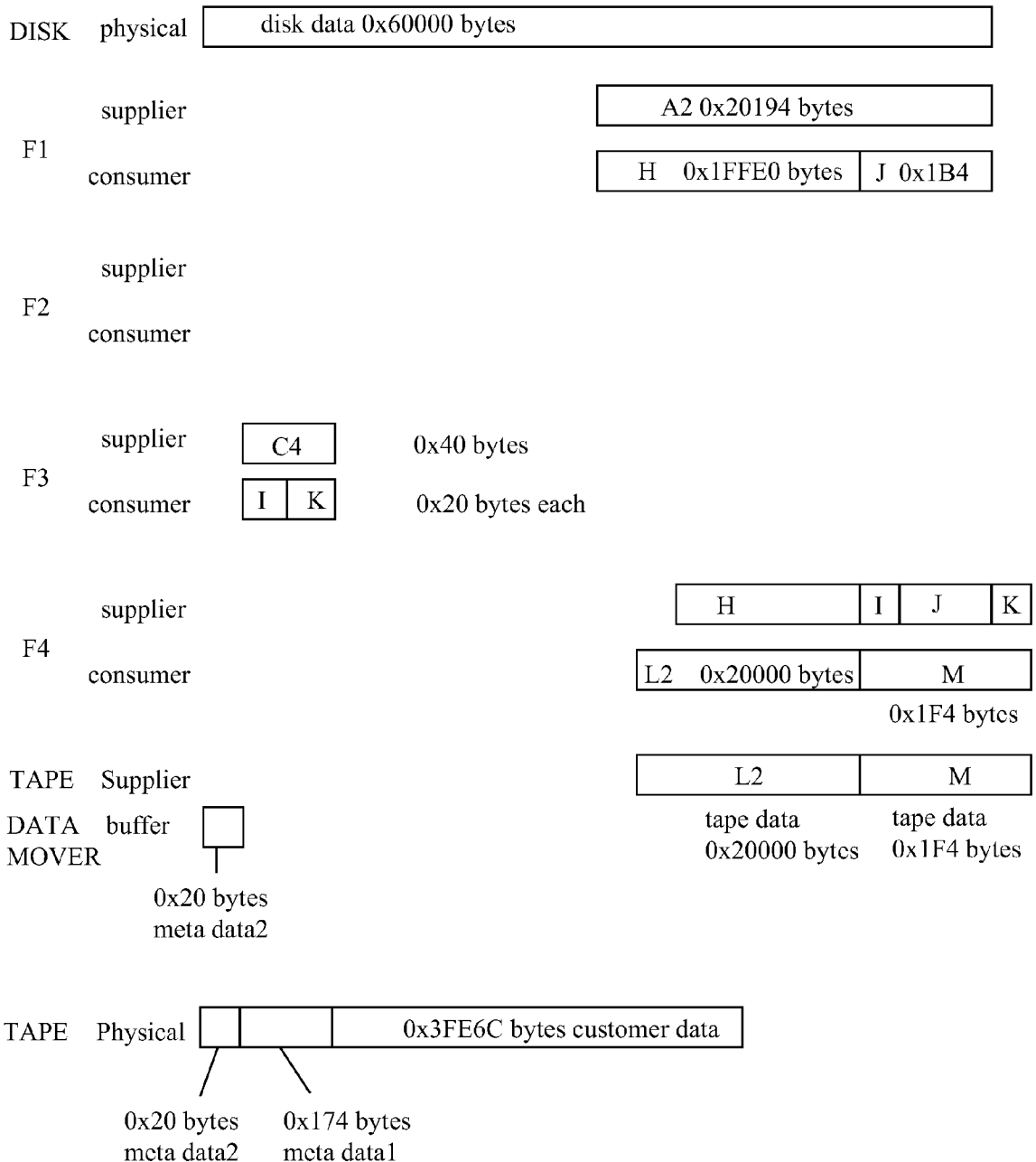

As shown in FIG. 13, the ACO lists will now be:

| | | | | |
|---|---|---|---|---|
| F1 supplier list: | A2 | | | |
| F1 consumer list: | H | J | | |
| F3 supplier list: | C4 | | | |
| F3 consumer list: | I | K | | |
| F4 supplier list: | H | I | J | K |
| F4 consumer list: | L2 | M | | |
| Destination tape supplier list: | L2 | M | | |

Data Mover Destination Buffer=0x20 bytes

Figure 14:
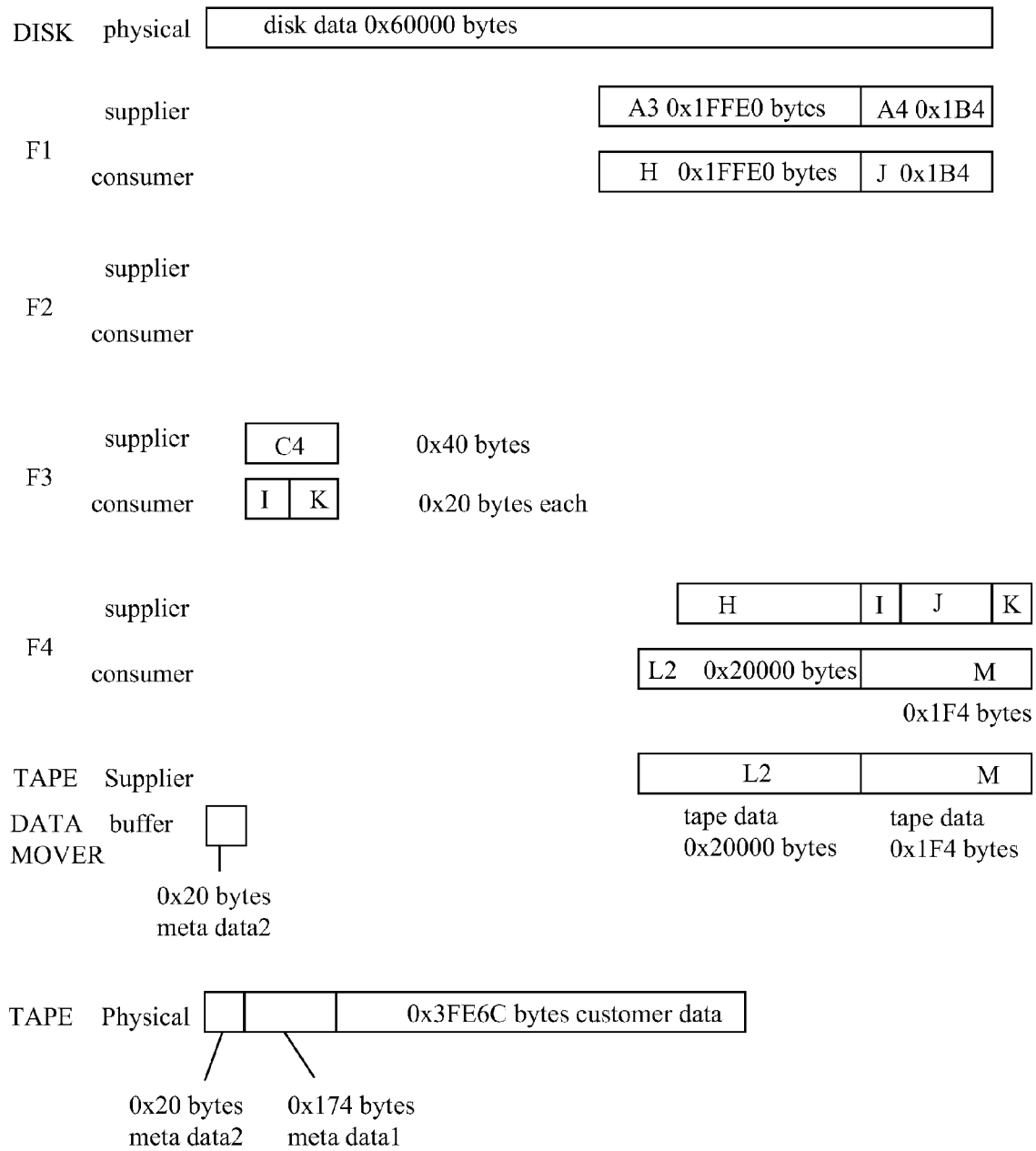

Now, the processing procedure will select the next ACO that transfers from one virtual FIFO to another, and attempt to reduce it to an ACO involving real devices, followed by conversion to a CCO. From the ACO set enumerated above, it will be seen that ACO H is the next ACO involving an inter-FIFO transfer. It is a transfer from F1 to F4 and is at the head of the F1 consumer list and the F4 supplier list. It will also be seen that ACO A2 is at the head of the F1 supplier list and that ACO L2 is at the head of the F4 consumer list. Thus, the processing procedure attempts to resolve ACO H into a transfer involving the ACOs A2 and L2. The byte blocks of A2, H, and L2 to be processed are as follows:
A2=0x20194 bytes
H=0x1FFE0 bytes
L2=0x20000 bytes Note that A2>H. Thus, A2 will be split into A3 and A4, where:
A3=0x1FFE0 bytes
A4=0x1B4 bytes As shown in FIG. 14, the ACO lists will now be:

| | | | | |
|---|---|---|---|---|
| F1 supplier list: | A3 | A4 | | |
| F1 consumer list: | H | J | | |
| F3 supplier list: | C4 | | | |
| F3 consumer list: | I | K | | |
| F4 supplier list: | H | I | J | K |
| F4 consumer list: | L2 | M | | |
| Destination tape supplier list: | L2 | M | | |

Data Mover Destination Buffer=0x20 bytes

Now, the processing procedure will select the combination of A3, H, and L2 to be processed:
A3=0x1FFE0 bytes
H=0x1FFE0 bytes
L2=0x20000 bytes The processing procedure will collapse A3, H and L2 to be A3H and L2. This will eliminate the inter-FIFO operation of ACO H and replace it with A3H, which is interpreted as:
A3H disk→F4 read in 0x1FFE0 bytes of customer data from disk to F4.

The byte blocks of A3H and L2 to be processed are as follows:
A3H=0x1FFE0 bytes where A3H has a real source and a virtual FIFO destination
L2=0x20000 bytes The ACO lists will now be:

| | | |
|---|---|---|
| F1 supplier list: | A4 | |
| F1 consumer list: | J | |
| F3 supplier list: | C4 | |
| F3 consumer list: | I | K |

-continued

| | | | | |
|---|---|---|---|---|
| F4 supplier list: | A3H | I | J | K |
| F4 consumer list: | L2 | M | | |
| Destination tape supplier list: | L2 | M | | |

Data Mover Destination Buffer=0x20 bytes

At this time, the ACOs A3H and L2 are operations that have a real source (disk device) and a real destination (tape device). The copy agent 58 is able to produce one CCO for the data mover 16 to perform by reading 0x1FFE0 bytes of data from source disk and first moving the meta data2 in the data mover's destination buffer (0x20 bytes) and then moving the disk data (0X1FFE0 bytes) to the destination tape device. The total tape data written is 0x20+0x1FFE0=0x20000 bytes. The copy agent 58 can then remove the ACOs A3H and L2 at the end of this operation.

Figure 15:
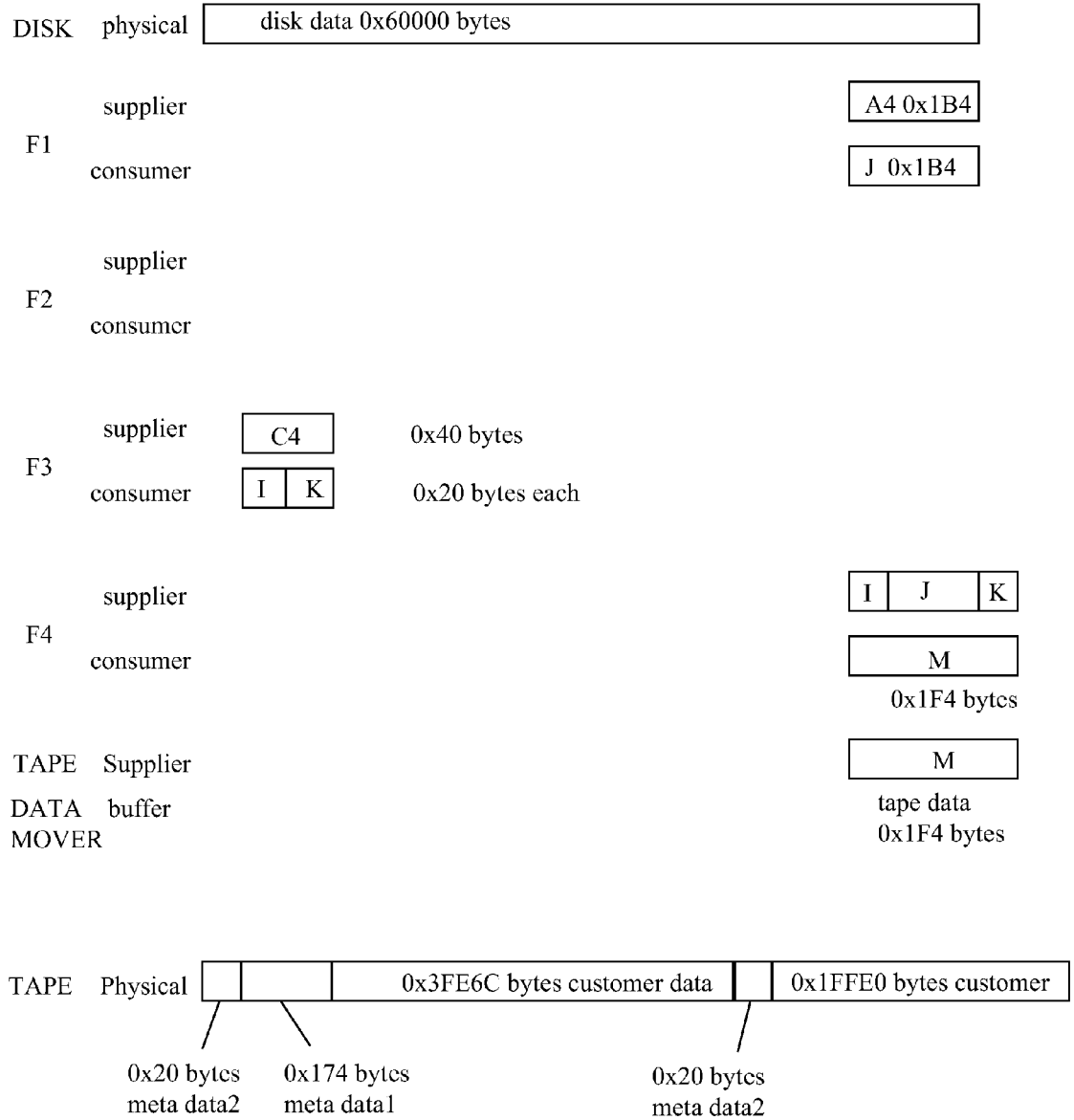

As shown in FIG. 15, the ACO lists will now be:

| | | | |
|---|---|---|---|
| F1 supplier list: | A4 | | |
| F1 consumer list: | J | | |
| F3 supplier list: | C4 | | |
| F3 consumer list: | I | K | |
| F4 supplier list: | I | J | K |
| F4 consumer list: | M | | |
| Destination tape supplier list: | M | | |

Figure 16:
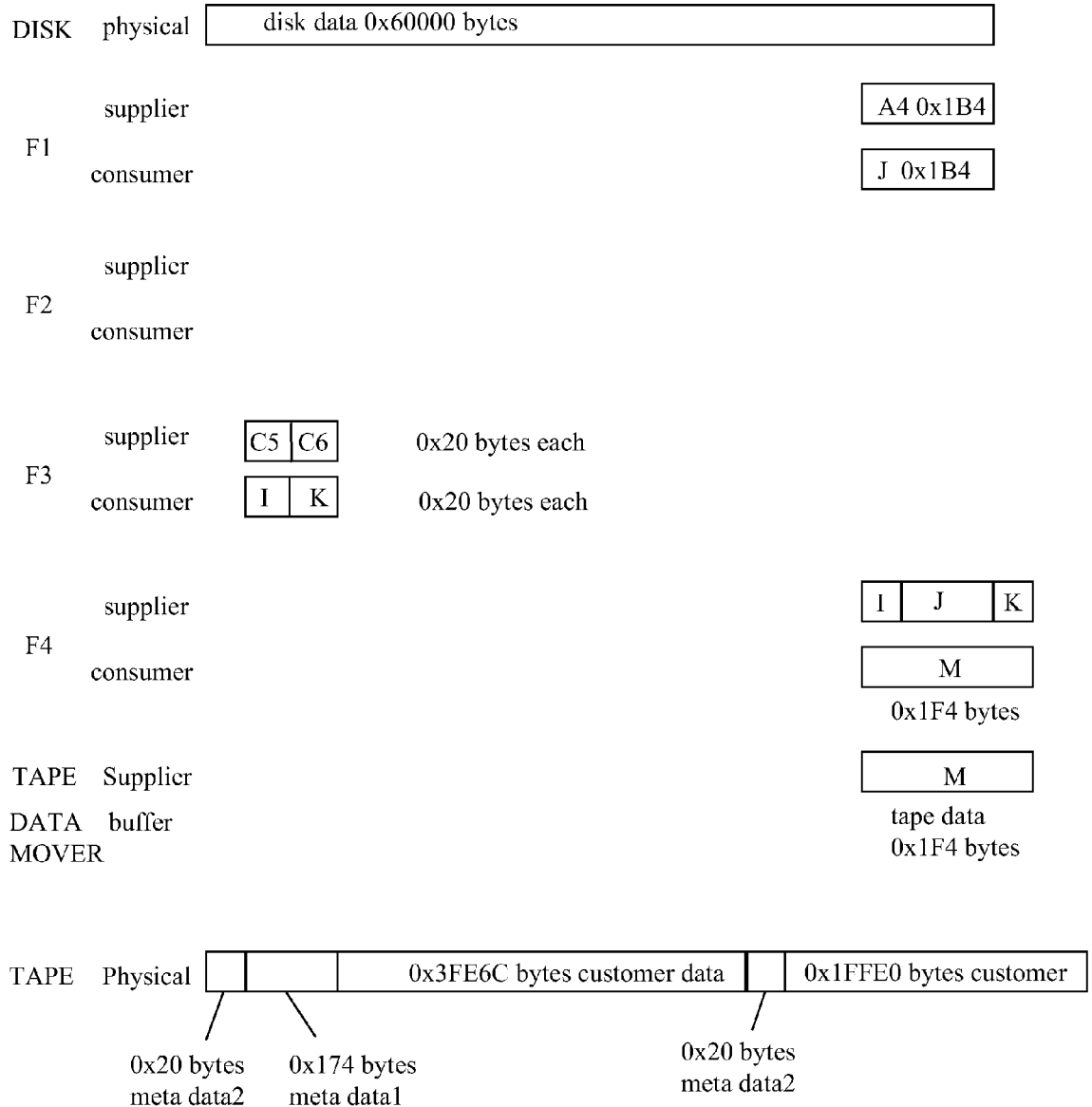

Now, the processing procedure will select the next ACO that transfers from one virtual FIFO to another, and attempt to reduce it to a CCO involving real devices. From the ACO set enumerated above, it will be seen that ACO I is the next ACO involving an inter-FIFO transfer. It is a transfer from F3 to F4 and is at the head of the F3 consumer list and the F4 supplier list. It will also be seen that ACO C4 is at the head of the F3 supplier list and that ACO M is at the head of the F4 consumer list. Thus, the processing procedure attempts to resolve ACO I into a transfer involving the ACOs C4 and M. The byte blocks of C4, I, and M to be processed are as follows:
C4=0x40 bytes
I=0x20 bytes
M=0x1F4 bytes Note that C4>I. Thus, C4 will be split into C5 and C6, where:
C5=0x20 bytes
C6=0x20 bytes As shown in FIG. 16, the ACO lists will now be:

| | | | |
|---|---|---|---|
| F1 supplier list: | A4 | | |
| F1 consumer list: | J | | |
| F3 supplier list: | C5 | C6 | |
| F3 consumer list: | I | K | |
| F4 supplier list: | I | J | K |
| F4 consumer list: | M | | |
| Destination tape supplier list: | M | | |

Now, the processing procedure will select the combination of C5, I, M to be processed:
C5=0x20 bytes
I=0x20 bytes
M=0x1F4 bytes The processing procedure will collapse C5, I and M to be C5, I and M. This will eliminate the inter-FIFO operation of ACO I and replace it with C5T, which is interpreted as:

C5I: lit→F4 0x20 bytes meta data2 provided to F4.

The byte blocks of C5I and M to be processed are as follows:
C5I=0x20 bytes where C5I has a real source and a virtual FIFO destination
M=0x1F4 bytes The ACO lists will now be:

| | | | |
|---|---|---|---|
| F1 supplier list: | A4 | | |
| F1 consumer list: | J | | |
| F3 supplier list: | C6 | | |
| F3 consumer list: | K | | |
| F4 supplier list: | C5I | J | K |
| F4 consumer list: | M | | |
| Destination tape supplier list: | M | | |

Figure 17:
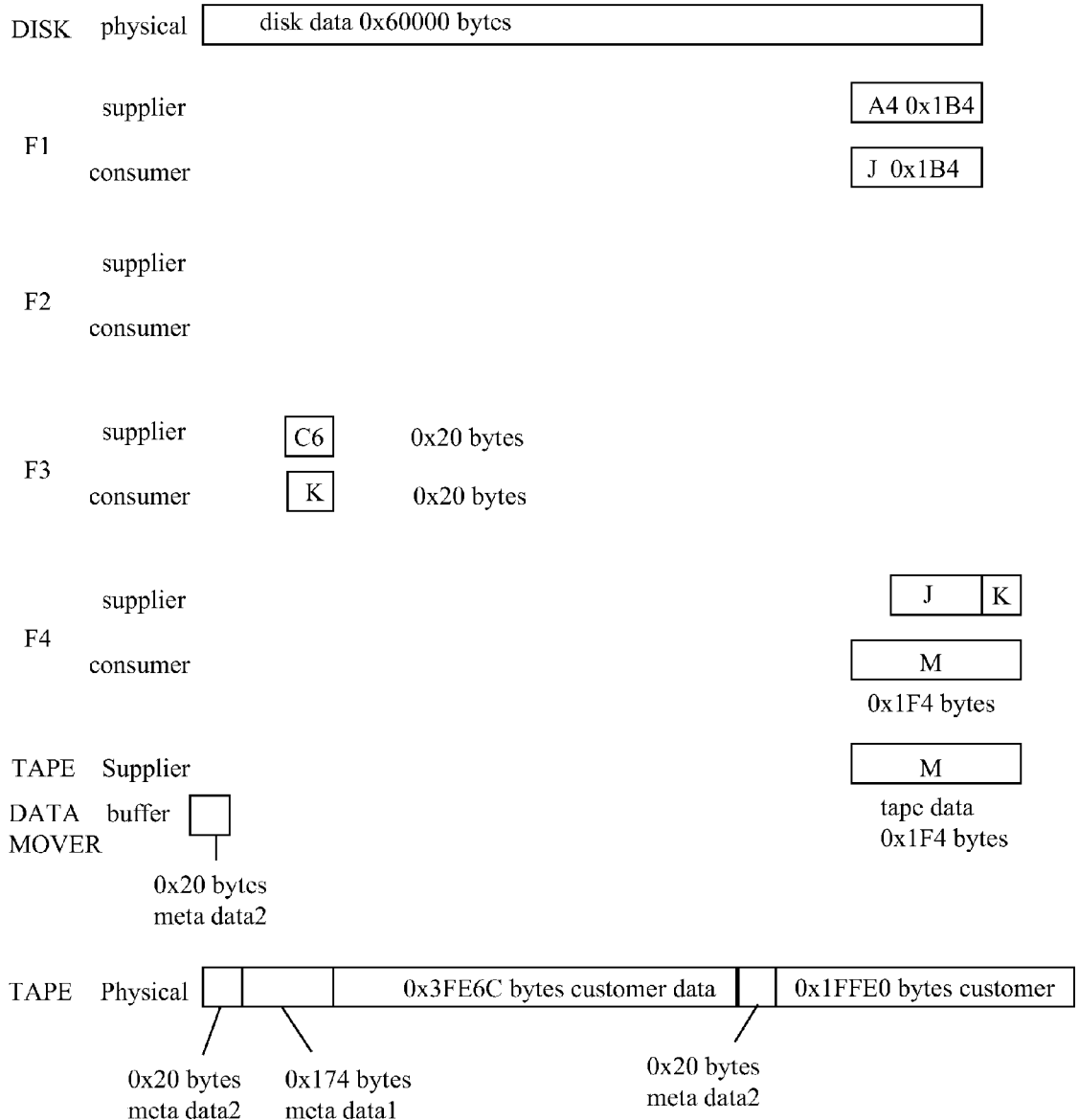

At this time, the ACOs C5I and M are operations which have a real source (meta data) and a real destination (tape device). The copy agent 58 is thus able to produce one CCO for the data mover 16 to perform by reading 0x20 bytes of meta data2 and moving it to the data mover's destination buffer. The copy agent 58 can then remove ACO C5I at the end of this operation. As shown in FIG. 17, the ACO lists will now be:

| | | |
|---|---|---|
| F1 supplier list: | A4 | |
| F1 consumer list: | J | |
| F3 supplier list: | C6 | |
| F3 consumer list: | K | |
| F4 supplier list: | J | K |
| F4 consumer list: | M | |
| Destination tape supplier list: | M | |

Data Mover Destination Buffer=0x20 bytes

Now, the processing procedure will select the next ACO that transfers from one virtual FIFO to another, and attempt to reduce it to a CCO involving real devices. From the ACO list above, it will be seen that ACO J is the next ACO involving an inter-FIFO transfer. It is a transfer from F1 to F4 and is at the head of the F1 consumer list and the F4 supplier list. It will also be seen that ACO A4 is at the head of the F1 supplier list and that M is at the head of the F4 consumer list. Thus, the processing procedure attempts to resolve ACO J into a transfer involving the ACOs A4 and M. The byte blocks of A4, J, and M to be processed are as follows:
A4=0x1B4 bytes
J=0x1B4 bytes
M=0x1F4 bytes The processing procedure will collapse A4, J and M to be A4J and M. This is to eliminate the inter-FIFO operation of ACO J and replace it with A4J, which is interpreted as:

A4J: disk→F4 read in 0x1B4 bytes customer data from disk to F4.

The byte blocks of A4J and M to be processed are as follows:
A4J=0x1B4 bytes where A4J has a real source and virtual FIFO destination
M=0x1F4 bytes The ACO lists will now be:

| | | |
|---|---|---|
| F3 supplier list: | C6 | |
| F3 consumer list: | K | |
| F4 supplier list: | A4J | K |

-continued

| F4 consumer list: | M |
|---|---|
| Destination tape supplier list: | M |

Data Mover Destination Buffer=0x20 bytes

At this time, the ACOs A4J and M are operations which have a real source (disk device) and a real destination (tape device). The copy agent 58 is thus able to produce one CCO for the data mover 16 to perform by reading 0x1B4 bytes of data from the source disk and moving this data to the data mover's destination buffer. The copy agent 58 can then remove the ACO A4J at the end of this operation.

Figure 18:
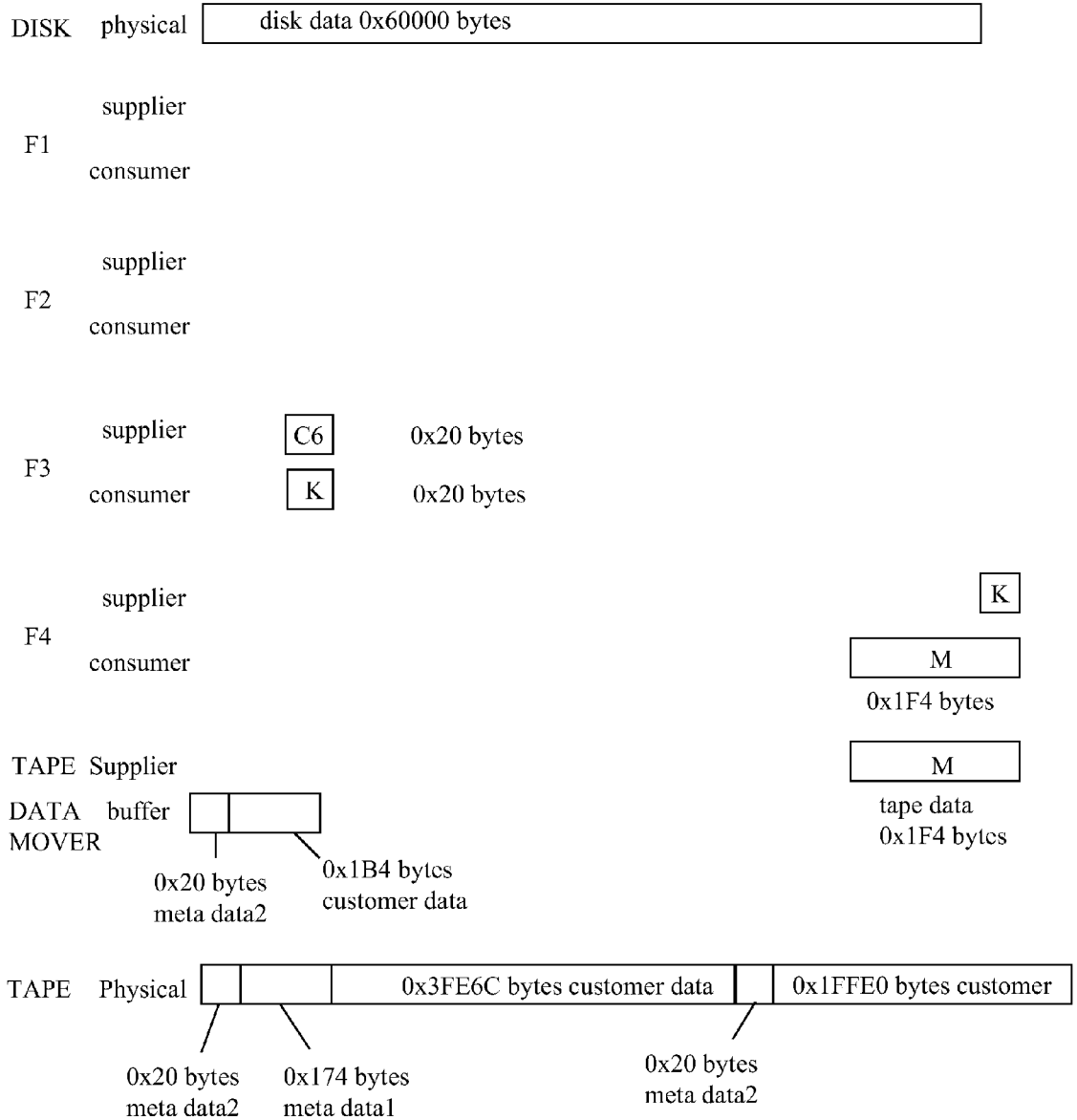

As shown in FIG. 18, the copy lists will now be:
    F3 copy order supplier list: C6
    F3 copy order consumer list: K
    F4 copy order supplier list: K
    F4 copy order consumer list: M
    Destination tape supplier copy order list: M
    Data Mover Destination Buffer=0x1D4 bytes Now, the processing procedure will select the next ACO that transfers from one virtual FIFO to another, and attempt to reduce it to a CCO involving real devices. From the ACO set enumerated above, it will be seen that ACO K is the next ACO involving an inter-FIFO transfer. It is a transfer from F3 to F4 and is at the head of the F3 consumer list and the F4 supplier list. It will be seen that ACO C6 is at the head of the F3 supplier list and ACO M is at the head of the F4 consumer list. Thus, the processing procedure attempts to resolve ACO K into a transfer involving the ACOs C6 and M. The byte blocks of C6, K, and M to be processed are as follows:
    C6=0x20 bytes
    K=0x20 bytes
    M=0x1F4 bytes The processing procedure will collapse the ACOs C6, K and M to be C6K and M. This will eliminate the inter-FIFO operation of ACO K and replace it with C6K, which is interpreted as:
    C6K: lit→F4 0x20 bytes meta data2 provided to F4.

Figure 19:
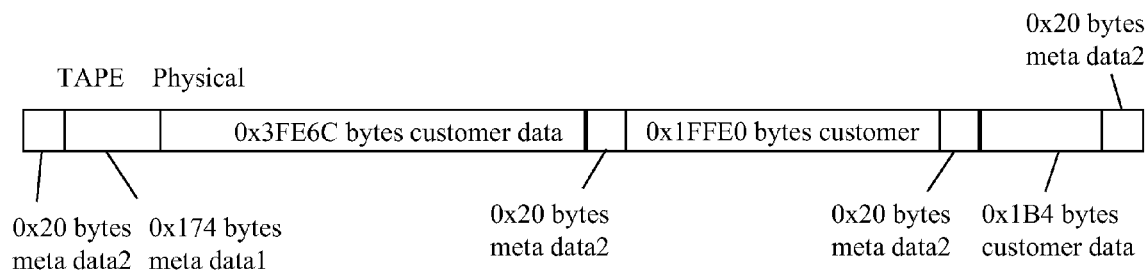

The byte blocks of C6K and M to be processed are as follows:
    C6K=0x20 bytes, where C6K has a real source and a virtual FIFO destination
    M=0x1F4 bytes At this time, the ACOs C6K and M are operations which have a real source (meta data) and a real destination (tape device). The copy agent 58 is thus able to produce one CCO for the data mover 16 to perform by reading 0x20 bytes of data from the source disk and first moving the data in the data mover's destination buffer (0x1D4 bytes) and then moving the data from the source disk (0x20 bytes). The total tape data written is 0x20+0x1D4=0x1F4 bytes. At this time, all the ACOs will have been processed and the data mover's buffer will have no more data. The extended copy operation will thus be completed. The result is shown in FIG. 19.

Exemplary Copy Agent Architecture

Figure 20:
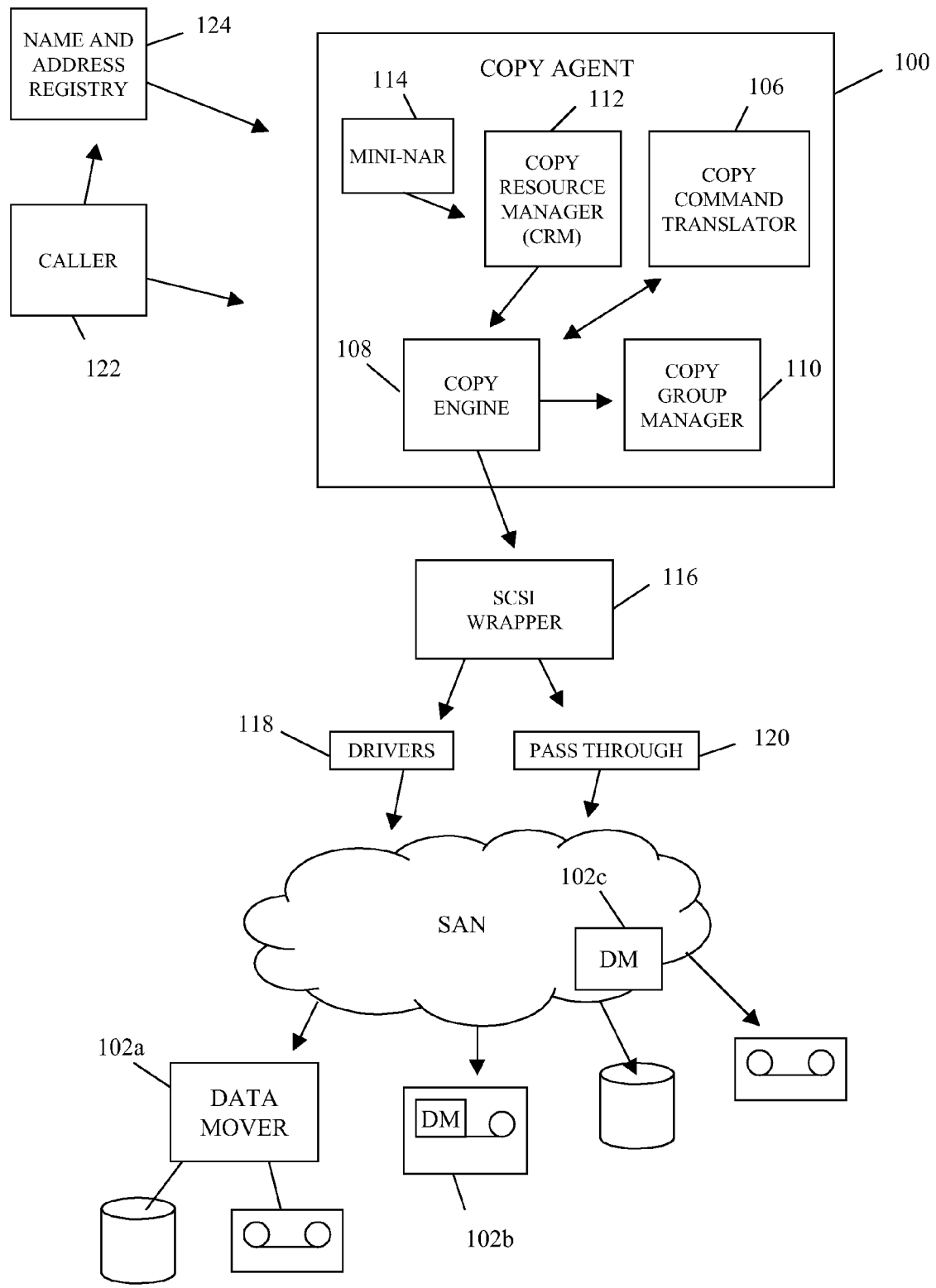
FIG. 20 is a functional block diagram showing an exemplary implementation of a copy agent in accordance with the invention.

Turning now to FIG. 20, an exemplary implementation 100 of the copy agent 58 of FIG. 5 is shown in conjunction with several data movers 102a, 102b or 102c that could be variously located in a SAN 104. In the copy agent 100 of FIG. 20, the copy agent includes a copy command translator 106 that performs the ACO-to-CCO translation functions described above. In addition, there is a copy engine 108, a copy group manager 110, a copy resource manager 112, and a mini-NAR (name/address registry) 114. A SCSI wrapper function 116 is shown to provide an interface to a drivers block 118 and a pass through block 120 leading to the SAN 104.

The copy command translator 106 can be implemented as an object oriented programming entity that is responsible for processing ACOs into CCOs between specified source and destination targets. Each instance thereof establishes and maintains several data records and implements a set of handling functions. The data records include source scope target and destination scope target records that respectively hold information about the source and destination targets, source buffer and destination buffer target records that respectively identify source and destination buffers associated with the data mover, supplier and consumer queues associated with the real (except disks) and virtual targets, and source and destination buffer byte records to keep track of how many bytes are in the data mover's source and destination buffers. The handling functions implemented by the copy command translator 106 may include the following:
    buildACompleteChain( ); /* builds a complete chain of CCOs from input ACOs */
    buildAChainFromDB( ); /* builds a CCO chain from the data mover's destination buffer */
    buildAChainFromSB( ); /* builds a CCO chain from the data mover's source buffer */
    collapseSFintoS; /* collapses a source FIFO target into a real source target */
    collapseDFintoD; /* collapses a destination FIFO target into a real destination target */

The copy engine 108 is a state machine that manages the copy agent's operations. Initially, the copy engine assumes a discovery mode whereby it investigates the status and capabilities of the data movers and real targets in the SAN 104. If the discovery process completes with successful results, the copy engine 108 enters a ready mode in which it is ready to process copy requests from a caller 122. If the discovery process does not complete successfully, the copy engine assumes a not_ready state. Assuming the copy engine 108 achieves the ready state, it will respond to a copy request from the caller 122 to generate a CCC based on an ACC passed to the copy agent 100 with the copy request. Initially, the copy engine 108 will preprocess the ACC by obtaining a name/address table index for the source and destination target of each ACO, by decoding any source and sink functions (inline data) associated with the ACC to obtain source/sink function attributes, by calculating the total number of bytes to be transferred, and by storing the foregoing as private information owned by the copy agent 100. The copy engine 108 will then create an instance of the copy command translator 106 and enqueue a Translate task that calls the copy command translator instance to perform the ACC-to-CCC translation. The copy engine 108 will then perform an Issue task that build one or more CCCs and pass them to the data mover 102a, 102b or 102c to execute. The copy engine 108 will thereafter return to the caller 122 to report the results of the copy request operation.

The copy group manager 110 can be implemented as an object oriented programming entity that is instantiated by the copy engine 108 and such that each instance is in one-to-one correspondence with a single ACC. Each copy group manager instance lives during the translation of its associated ACC and then is deleted. The copy group manager instance points to a list of the CCCs generated from the ACC. It also owns a source function table and a sink function table that keep track of all source and sink function data, owns buffers for copies of the source and sink data, keeps track of the number of times the buffers are referenced and determines when to free the buffers, and makes sure that each source and sink function is called only once.

The copy resource manager 112 can be implemented as an object oriented programming entity that is instantiated and initialized when the copy agent 100 is invoked. It is responsible for preallocating a pool of ACOs, instantiating a copy engine instance, and establishing several tables and queues. The latter include a resource table containing all targets that the copy agent 100 is informed about when it is invoked, a copy engine table to hold all copy engine instances, a service work queue that owns the copy agent's processing threads, and a preferred target descriptor array to preset the most desired target descriptor types used in CCCs generated by the copy agent 100.

The mini-NAR 114 owns a database of all real device path information (e.g., real source and destination targets, data movers, etc.). It contains a subset of the database information stored in a global NAR 124. Each device is identified in the mini-NAR 114 (and the NAR 124) by one or more handles that correspond to real path information. Real devices thus do not need to be handled in the copy agent 100 via separate descriptors and instead can be identified by mini-NAR handles within each ACO. The handles can be used to obtain information from the mini-NAR 114 as necessary for producing the target descriptors for generated CCOs.

The SCSI wrapper 116 is used to conform the CCOs generated by the copy agent 100 to the SCSI format requirements of the real devices involved in the copy request. Similarly, the drivers block 118 provides device level formatting for CCOs that require it, while the pass through block 120 handles CCOs that do not require such formatting.

In an exemplary embodiment of the invention, the copy agent 100 can be implemented with an API (application programming interface) that includes the following functions (the accompanying "C" language comments describe the function's purpose):

```
void sxcInitialization( ); /* instantiates a Copy Resource
    Manager and initializes SCSI wrapper data structure */
sxcRc queryEngine(narEngineAdr* EngineAdrP); /* dis-
    covers copy engine using input address information */
narRc sxcInitializeNaInCa(narEngineAdr* EngineAdrL-
    istP, narTargetinfo* TargetinfoListP); /* performs copy
    engine discovery using the input address engine list if
    the copy engine type is "server free" and the copy agent
    does not have it in the mini-NAR 114 */
sxcRc sxcOpenSession(void** sessionPPtr, narScope-
    Handle copyEngineHandle); /* makes sure that the
    copyEngineHandle is valid and the copy engine is ready,
    then instantiates an SxcCopySession and loads the ses-
    sion pointer in sessionPPtr */
sxcRc sxcPerformCopy(sxcAbsCopyCommand* com-
    mandP, void* sessionP); /* initiates a copy request based
    on individual ACOs specified in commandP (see below)
    */
sxcRc sxcAbortCopy(sxcAbsCopyCommand* com-
    mandP, void* sessionP); /* terminates copy request */
sxcRc sxcCloseSession(void* SessionP); /* deletes Sxc-
    CopySession instance */
```

A variety of ACO types may be defined for use in building an ACC as specified in the "commandP" parameter of the sxcPerformCopy( ) function. This command parameter is a pointer to a data structure that contains a pointer to an array of ACOs and a count of them. The ACOs are implemented as fixed-size structures that describe the elemental operations of the copy agent 100. As previously described, the main ACOs represent transfers of a contiguous unit of data on a source target to a contiguous range of locations on a destination target. They also include certain non-data operations that are to occur in sequence. Some ACOs may be defined to insert "markers" into virtual FIFOs, which cause events to "fire" when the data ahead of the marker has been consumed. Consumption of the data implies that the real I/O steps required to supply the data have been performed, so any CCC(s) that have been issued to effect these I/Os must have returned status. Still other ACO types may indicate that the remainder of the ACO contains (opaquely) a CCO. To the extent that an ACO requires more information than will fit in the fixed-size ACO structure, the ACO may contain references in the form of data pointers, handles, and/or function pointers by which the additional data can be accessed. For example, literal data can be provided to an ACO in this way.

Following is an exemplary listing of ACO types that may be used to implement server free functionality using virtual targets in accordance with the invention and as understood by the sxcPerformCopy( ) command. Many additional ACO types could also be developed, depending on design preferences.

Whole Block Virtual FIFO and Partial Block Transfers to/from Virtual FIFOs

The following exemplary ACO functions may be used to allow either a number of blocks or a range within a single block to be read into a virtual FIFO, or to be written using data drawn from a virtual FIFO. The function names describe the ACO operation performed:

```
sxcOpDiskToFifo( );
sxcOpTapetoFifo( );
sxcOpFifoToDisk( );
sxcOpFifoToTape( );
sxcOpDiskPartToFifo( );
sxcOpTapePartToFifo( );
sxcOpFifoToDiskPart( ).
```

In the foregoing ACOs, the number of bytes determined by the block count or byte range on the real device determines the bytes added to/removed from the virtual FIFO. A partial block write requires the copy engine 108 to perform a read-modify-write cycle, and may not be implemented as primitive facility. It is thus better to formulate ACCs so that only whole blocks are written. A partial block read discards any data not in the specified range, and for a tape device leaves the read position at the beginning of the following block. If other data in the block is to be used for other ACOs without rereading, it is necessary to read it into a virtual FIFO and pick out the desired pieces with inter-FIFO ACO types.

Byte Transfers To/From Virtual FIFOs

The following exemplary ACO functions may be used to allow data to be copied or moved between virtual FIFOs. Again, the function names describe the ACO operations performed:

```
sxcOpLiteralToFifo;
sxcOpFifoToDiscard;
sxcOpFifoToFifoMove;
sxcOpFifoToFifocopy;
sxcOpFifoToApplication.
```

Using the first four ACOs, data can be copied or moved between virtual FIFOs, literal data can be appended to virtual FIFOs, and leading data can be removed from virtual FIFOs. Using the fifth ACO, data in a virtual FIFO can also be extracted and returned to the caller via a callback. If desired, the foregoing ACOs can also be implemented so that the entire content of a virtual FIFO can be copied, moved or discarded without specifying the number of bytes.

Accordingly, a system and method have been disclosed for using virtual targets for preparing and servicing requests for server free data transfer operations in a data storage network. It will be appreciated from the foregoing that the system of the invention can be implemented as a software modification to an existing data network storage manager server that is adapted for server free data transfer operations, while the method can be performed within the modified server. In a further aspect, the invention can be embodied in a computer program product in which the software required to implement the functions of the invention are stored in object or source code form on a data storage medium, such as one or more portable (or non-portable) magnetic or optical disks.

FIG. 21 illustrates an exemplary computer program product 200 in which the storage medium comprises one or more optical disks. The computer program product 200 can be used by a storage network administrator to add virtual target-based server free data transfer functionality in accordance with the invention to a conventional storage manager server. In a typical scenario, a copy of the code resident on the computer program product 200 will be installed onto the storage manager server 2 so that the code is copied onto a local data storage medium. If the code is in binary form it will be ready for execution. Other, the code can be compiled as necessary to reduce it to executable form.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A system for supporting server-free data transfers between data storage devices in a data storage network in cooperation with a data mover in the network, comprising:
   a programmable computer platform configured with one or more computer readable storage media storing instructions that are executable by said computer platform to perform operations, comprising:
   generating abstract copy orders representing data transfers involving virtual targets;
   said virtual targets being associated with queues that queue said abstract copy orders;
   each abstract copy order that is queued by one of said virtual targets representing a virtual supplier or a virtual consumer of data to or from said virtual target;
   converting said abstract copy orders into concrete copy orders involving only real device targets for execution by said data mover; and
   said converting comprising said abstract copy orders involving real source targets being prepared separately from abstract copy orders involving real destination targets and thereafter merged into said concrete copy orders.

2. A system in accordance with claim 1 wherein said virtual targets are virtual FIFOs.

3. A system in accordance with claim 1 wherein said abstract copy orders are data transfer requests that specify (a) a source target and a destination target with at least one of said targets being virtual, (b) data locating information as necessary to locate said data on said source or destination target if either is real, and (c) data size information.

4. A system in accordance with claim 3 wherein said concrete copy orders are SCSI-3 extended copy command segment descriptors.

5. A system in accordance with claim 1 wherein said abstract copy orders are converted into concrete copy orders by merging pairs of abstract copy orders that reference a common virtual target along with respective real source and destination targets so that for each abstract copy order pair said real source target is combined with said real destination target to form a concrete copy order.

6. A system in accordance with claim 1 wherein said abstract copy orders are converted to concrete copy orders by grouping abstract copy orders involving a common virtual target into supplier and consumer lists, and merging pairs of abstract copy orders at the head of each list so that a real source target associated with one abstract copy order of a pair is linked to a real destination target associated with another abstract copy order of said pair.

7. A system in accordance with claim 1 wherein said operations further include generating inter-virtual target abstract copy orders involving data transfers between virtual source and destination targets.

8. A system in accordance with claim 7 wherein said inter-virtual target abstract copy orders are used to accommodate data reordering or inline data insertion when implementing server-free data transfers.

9. A system in accordance with claim 7 wherein said operations further include collapsing each of said inter-virtual target abstract copy orders into an abstract copy order supplying data from a real source target to said source virtual target with an abstract copy order providing data from said destination virtual target to a real destination target.

10. A system in accordance with claim 1 wherein said operations further include dividing said abstract copy orders into separate abstract copy orders involving data transfers of smaller size in order to accommodate data deadlock conditions.

11. A system in accordance with claim 1 wherein said operations further include generating data buffer commands for said data mover to buffer data until a data transfer to a real destination target can be performed that will allow an abstract copy order specifying said real destination target to be eliminated.

12. A storage manager server for supporting server-free data transfers between data storage devices in a data storage network in cooperation with a data mover in the network, comprising:
   a programmable computer platform configured with one or more computer readable storage media storing instructions that are executable by said computer platform to perform operations, comprising:
   generating abstract copy orders representing data transfers involving virtual targets;
   said virtual targets being associated with queues that queue said abstract copy orders;
   each abstract copy order that is queued by one of said virtual targets representing a virtual supplier or a virtual consumer of data to or from said virtual target;
   converting said abstract copy orders into concrete copy orders involving only real device targets for execution by said data mover; and
   said converting comprising said abstract copy orders involving real source targets being prepared separately from abstract copy orders involving real destination targets and thereafter merged into said concrete copy orders.

13. A storage manager server in accordance with claim 12 wherein said virtual targets are virtual FIFOs.

14. A storage manager server in accordance with claim 12 wherein said abstract copy orders are data transfer requests that specify (a) a source target and a destination target with at least one of said targets being virtual, (b) data locating information as necessary to locate said data on said source or destination target if either is real, and (c) data size information.

15. A storage manager server in accordance with claim 14 wherein said concrete copy orders are SCSI-3 extended copy command segment descriptors.

16. A storage manager server in accordance with claim 12 wherein said abstract copy orders are converted into concrete copy orders by merging pairs of abstract copy orders that reference a common virtual target along with respective real source and destination targets so that for each abstract copy order pair said real source target is combined with said real destination target to form a concrete copy order.

17. A storage manager server in accordance with claim 12 wherein said abstract copy orders are converted to concrete copy orders by grouping abstract copy orders involving a common virtual target into supplier and consumer lists, and merging pairs of abstract copy orders at the head of each list so that a real source target associated with one abstract copy order of a pair is linked to a real destination target associated with another abstract copy order of said pair.

18. A storage manager server in accordance with claim 12 wherein said operations further include generating inter-virtual target abstract copy orders involving data transfers between virtual source and destination targets.

19. A storage manager server in accordance with claim 18 wherein said inter-virtual target abstract copy orders are used to accommodate data reordering or inline data insertion when implementing server-free data transfers.

20. A storage manager server in accordance with claim 18 wherein said operations further include collapsing each of said inter-virtual target abstract copy orders into an abstract copy order supplying data from a real source target to said source virtual target with an abstract copy order providing data from said destination virtual target to a real destination target.

21. A storage manager server in accordance with claim 12 wherein said operations further include dividing said abstract copy orders into separate abstract copy orders involving data transfers of smaller size in order to accommodate data deadlock conditions.

22. A storage manager server in accordance with claim 12 wherein said operations further include generating data buffer commands for said data mover to buffer data until a data transfer to a real destination target can be performed that will allow an abstract copy order specifying said real destination target to be eliminated.

23. A computer readable storage medium storing instructions which, when executed on a data processing apparatus, will perform operations for supporting server-free data transfers between data storage devices in a data storage network in cooperation with a data mover in the network, comprising:

generating abstract copy orders representing data transfers involving virtual targets;

said virtual targets being associated with queues that queue said abstract copy orders;

each abstract copy order that is queued by one of said virtual targets representing a virtual supplier or a virtual consumer of data to or from said virtual target;

converting said abstract copy orders into concrete copy orders involving only real device targets for execution by said data mover; and said converting comprising said abstract copy orders involving real source targets being prepared separately from abstract copy orders involving real destination targets and thereafter merged into said concrete copy orders.

24. A computer program product in accordance with claim 23 wherein said virtual targets are virtual FIFOs.

25. A computer program product in accordance with claim 23 wherein said abstract copy orders are data transfer requests that specify (a) a source target and a destination target with at least one of said targets being virtual, (b) data locating information as necessary to locate said data on said source or destination target if either is real, (c) and data size information.

26. A computer program product in accordance with claim 25 wherein said concrete copy orders are SCSI-3 extended copy command segment descriptors.

27. A computer program product in accordance with claim 23 wherein said abstract copy orders are converted into concrete copy orders by merging pairs of abstract copy orders that reference a common virtual target along with respective real source and destination targets so that for each abstract copy order pair said real source target is combined with said real destination target to form a concrete copy order.

28. A computer program product in accordance with claim 23 wherein said abstract copy orders are converted to concrete copy orders by grouping abstract copy orders involving a common virtual target into supplier and consumer lists, and merging pairs of abstract copy orders at the head of each list so that a real source target associated with one abstract copy order of a pair is linked to a real destination target associated with another abstract copy order of said pair.

29. A computer program product in accordance with claim 23 wherein said operations further include generating inter-virtual target abstract copy orders involving data transfers between virtual source and destination targets.

30. A computer program product in accordance with claim 29 wherein said inter-virtual target abstract copy orders are used to accommodate data reordering or inline data insertion when implementing server-free data transfers.

31. A computer program product in accordance with claim 29 wherein said operations further include collapsing each of said inter-virtual target abstract copy orders into an abstract copy order supplying data from a real source target to said source virtual target with an abstract copy order providing data from said destination virtual target to a real destination target.

32. A computer program product in accordance with claim 23 wherein said operations further include dividing said abstract copy orders into separate abstract copy orders involving data transfers of smaller size in order to accommodate data deadlock conditions.

33. A computer program product in accordance with claim 23 wherein said operations further include generating data buffer commands for said data mover to buffer data until a data transfer to a real destination target can be performed that will allow an abstract copy order specifying said real destination target to be eliminated.

* * * * *